US012158988B2

(12) United States Patent
Poulos et al.

(10) Patent No.: US 12,158,988 B2
(45) Date of Patent: Dec. 3, 2024

(54) MAPPING A COMPUTER-GENERATED TRACKPAD TO A CONTENT MANIPULATION REGION

(71) Applicant: Apple Inc., Cupertino, CA (US)

(72) Inventors: Adam G. Poulos, Saratoga, CA (US); Aaron M. Burns, Sunnyvale, CA (US); Arun Rakesh Yoganandan, San Francisco, CA (US); Benjamin R. Blachnitzky, San Francisco, CA (US); Nicolai Georg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/114,447

(22) Filed: Feb. 27, 2023

(65) Prior Publication Data

US 2023/0376110 A1  Nov. 23, 2023

Related U.S. Application Data

(63) Continuation of application No. PCT/US2021/041928, filed on Jul. 16, 2021.

(60) Provisional application No. 63/107,305, filed on Oct. 29, 2020, provisional application No. 63/073,758, filed on Sep. 2, 2020.

(51) Int. Cl.
  *G06F 3/01* (2006.01)
(52) U.S. Cl.
  CPC .............. *G06F 3/014* (2013.01); *G06F 3/017* (2013.01)
(58) Field of Classification Search
  USPC ........................................................ 345/156
  See application file for complete search history.

(56) References Cited

U.S. PATENT DOCUMENTS 8,386,060 B2    2/2013   Miller
8,754,855 B2    6/2014   Duncan et al.
9,874,977 B1 *  1/2018   Soyannwo .............. G06F 3/042
(Continued)

FOREIGN PATENT DOCUMENTS

WO     2018194569 A1    10/2018

OTHER PUBLICATIONS

PCT International Search Report and Written Opinion dated Jan. 10, 2022, PCT International Application No. PCT/US2021/041928, pp. 1-18.

*Primary Examiner* — Chineyere D Wills-Burns
(74) *Attorney, Agent, or Firm* — Fernando & Partners, LLP

(57) ABSTRACT

A method is performed at an electronic device with one or more processors, a non-transitory memory, a display, and an extremity tracker. The method includes obtaining extremity tracking data via the extremity tracker. The method includes displaying a computer-generated representation of a trackpad that is spatially associated with a physical surface. The physical surface is viewable within the display along with a content manipulation region that is separate from the computer-generated representation of the trackpad. The method includes identifying a first location within the computer-generated representation of the trackpad based on the extremity tracking data. The method includes mapping the first location to a corresponding location within the content manipulation region. The method includes displaying an indicator indicative of the mapping. The indicator may overlap the corresponding location within the content manipulation region.

25 Claims, 27 Drawing Sheets

(56) References Cited

U.S. PATENT DOCUMENTS

| | | | |
|---|---|---|---|
| 9,880,619 B2 | 1/2018 | Parham et al. | |
| 11,054,896 B1* | 7/2021 | Wilytsch | G06F 3/04815 |
| 11,687,165 B2* | 6/2023 | Yitzhak | G06F 3/017 |
| | | | 345/156 |
| 2003/0214481 A1 | 11/2003 | Xiong | |
| 2010/0245260 A1* | 9/2010 | Louch | G06F 3/0482 |
| | | | 345/173 |
| 2011/0296333 A1* | 12/2011 | Bateman | G06F 3/04883 |
| | | | 345/173 |
| 2013/0241832 A1* | 9/2013 | Rimon | G06F 3/03545 |
| | | | 345/158 |
| 2013/0342564 A1* | 12/2013 | Kinnebrew | G09G 3/003 |
| | | | 345/619 |
| 2016/0306431 A1* | 10/2016 | Stafford | G02B 27/017 |
| 2018/0005437 A1* | 1/2018 | Anderson | G06F 3/0304 |
| 2018/0239138 A1* | 8/2018 | Demchenko | G02B 27/017 |
| 2018/0364853 A1* | 12/2018 | Pahud | G06F 3/0393 |
| 2019/0370715 A1* | 12/2019 | Fikani | G06F 3/017 |
| 2020/0033944 A1* | 1/2020 | Kiemele | G06T 19/006 |
| 2020/0082632 A1* | 3/2020 | Burns | G06T 19/20 |
| 2020/0097119 A1* | 3/2020 | Pahud | G06F 3/0393 |
| 2020/0104025 A1* | 4/2020 | Iglesias | G06F 3/04845 |
| 2021/0097776 A1* | 4/2021 | Faulkner | G06F 3/04842 |

* cited by examiner

MAPPING A COMPUTER-GENERATED TRACKPAD TO A CONTENT MANIPULATION REGION

CROSS-REFERENCE TO RELATED APPLICATIONS

This application is a continuation of Intl. Patent App. No. PCT/US2021/041928, filed on Jul. 16, 2021, which claims priority to U.S. Provisional Patent App. No. 63/107,305, filed on Oct. 29, 2020 and U.S. Provisional Patent App. No. 63/073,758, filed on Sep. 2, 2020, which are hereby incorporated by reference in their entireties.

TECHNICAL FIELD

The present disclosure relates to mapping to a viewable region, and in particular input-driven mapping to the viewable region.

BACKGROUND

An electronic device may enable manipulation of displayed content based on an input from an integrated input system, such as an extremity tracking input. Utilizing an input from an integrated input system in order to manipulate content introduces a number of issues. For example, when a physical object occludes a portion of an extremity of a user, the reliability of the extremity tracking input is correspondingly reduced. As another example, content that has a relatively high depth with respect to the display, such as a computer-generated object located in a scene background, may be difficult for a user to manipulate, thereby introducing tracking inaccuracies.

SUMMARY

In accordance with some implementations, a method is performed at an electronic device with one or more processors, a non-transitory memory, a display, and an extremity tracker. The method includes obtaining extremity tracking data from via the extremity tracker. The method includes displaying, on the display, a computer-generated representation of a trackpad that is spatially associated with a physical surface. The physical surface is viewable within the display along with a content manipulation region that is separate from the computer-generated representation of the trackpad. The method includes identifying a first location within the computer-generated representation of the trackpad based on the extremity tracking data. The method includes mapping the first location to a corresponding location within the content manipulation region. The method includes displaying, on the display, an indicator indicative of the mapping. The indicator may overlap the corresponding location within the content manipulation region.

In accordance with some implementations, an electronic device includes one or more processors, a non-transitory memory, a display, and an extremity tracker. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
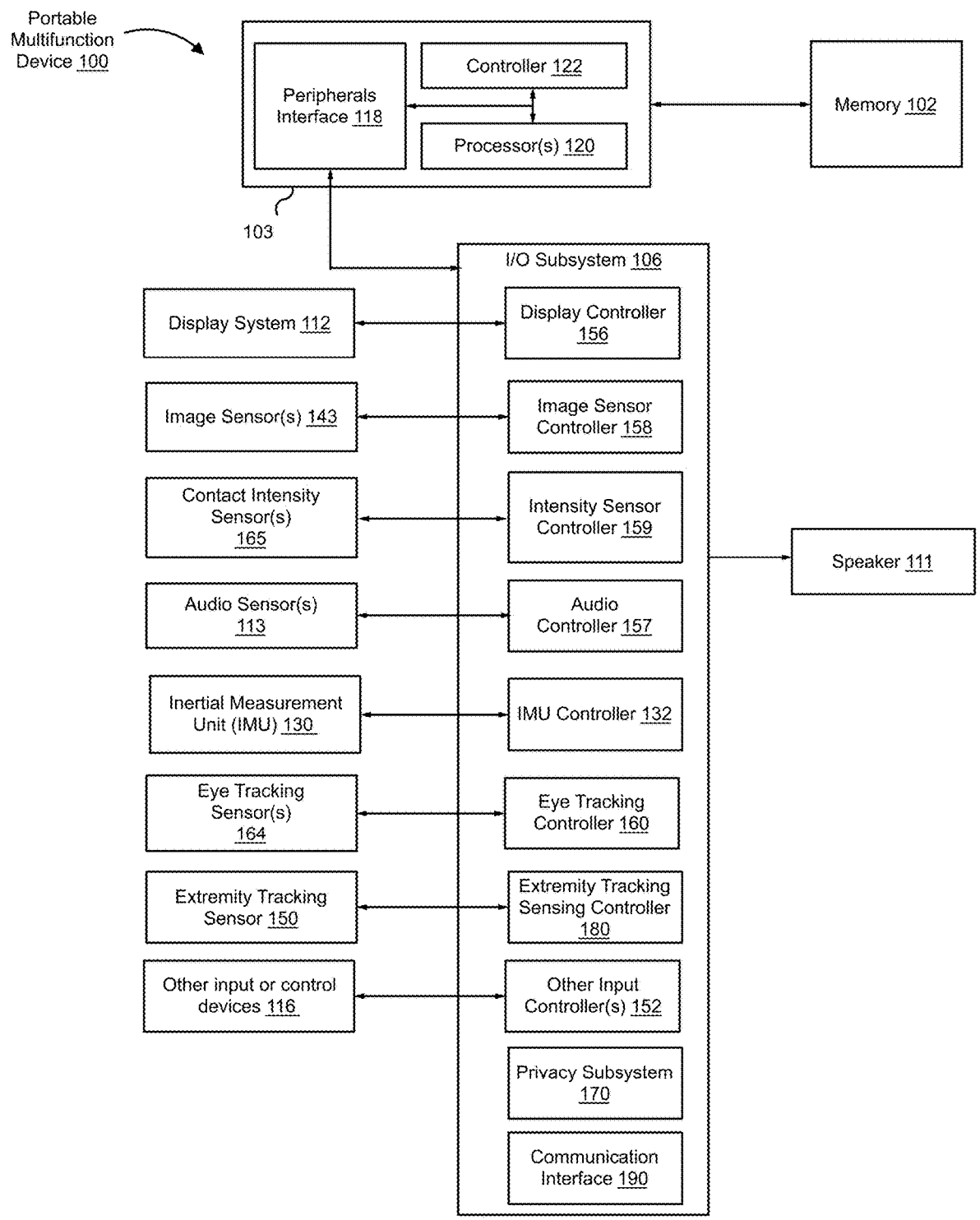
FIG. 1 is a block diagram of an example of a portable multifunction device in accordance with some implementations.

An electronic device, including an integrated input system, may manipulate the display of a computer-generated object based on an input from the integrated input system. For example, the integrated input system includes an extremity tracking input system and/or an eye tracking input system. As one example, based on an extremity tracking input from the extremity tracking input system, the electronic device determines a corresponding extremity of a user satisfies a proximity threshold with respect to a particular computer-generated object. Accordingly, the electronic device manipulates the particular computer-generated object based on the extremity tracking input. However, utilizing an input from an integrated input system in order to manipulate a computer-generated object introduces a number of issues. For example, when a physical object occludes (e.g., blocks) a portion of a user's extremity, the reliability of the extremity tracking input is correspondingly reduced. As another example, the limited mobility of a user's eyes and the unsteadiness of the user's extremity reduces the efficiency associated with manipulating a computer-generated object. As yet another example, a computer-generated object that has a relatively high depth with respect to the display, such as a computer-generated object located in a scene background, may be difficult for a user to manipulate, thereby introducing extremity tracking and eye tracking inaccuracies.

By contrast, various implementations disclosed herein include methods, electronic devices, and systems for mapping between a computer-generated representation of a trackpad and a spatially distinct content manipulation region, based on extremity tracking data. For example, in some implementations, an electronic device includes a communication interface provided to communicate with a finger-wearable device, and the electronic device obtains finger manipulation data from the finger-wearable device via the communication interface. The finger manipulation data may be included in the extremity tracking data. As another example, in some implementations, an electronic device includes a computer-vision system (e.g., object identification with respect to image data) that outputs extremity identification data. The extremity identification data may be included in the extremity tracking data.

The electronic device displays an indicator indicative of the mapping. For example, based on finger manipulation data, the electronic device determines that the finger-wearable device is hovering over or contacting the center of the computer-generated representation of a trackpad. Accordingly, the electronic device displays an indicator at the center of the content manipulation region. By displaying an indication of the mapping, the electronic device provides feedback to a user characterizing the finger-wearable device engaging with the content manipulation region in some implementations. The feedback reduces the number of erroneous (e.g., undesired) inputs the electronic device receives from the finger-wearable device, thereby reducing resource utilization by the electronic device.

Accordingly, various implementations disclosed herein enable a user to effectively engage with (e.g., manipulate) content that is within a content manipulation region. For example, when the finger manipulation data indicates that the finger-wearable device is drawing a circle on the computer-generated representation of the trackpad, the electronic device displays a corresponding representation of the circle within the content manipulation region. Accordingly, as compared with other devices, the electronic device provides more control and accuracy when engaging with the content manipulation region.

The finger-wearable device can be worn by a finger of a user. In some implementations, the electronic device tracks the finger with six degrees of freedom (6DOF) based on the finger manipulation data. Accordingly, even when a physical object occludes a portion of the finger-wearable device, the electronic device continues to receive finger manipulation data from the finger-wearable device. On the other hand, other devices that utilize extremity tracking cannot track an extremity of a user when a physical object occludes the extremity. Additionally, the electronic device enables object engagement (e.g., disambiguation, manipulation, etc.) based on the finger manipulation data, independent of an apparent distance between the finger-wearable device and the content manipulation region, resulting in greater control and accuracy.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, a privacy subsystem 170, and a communication interface 190. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
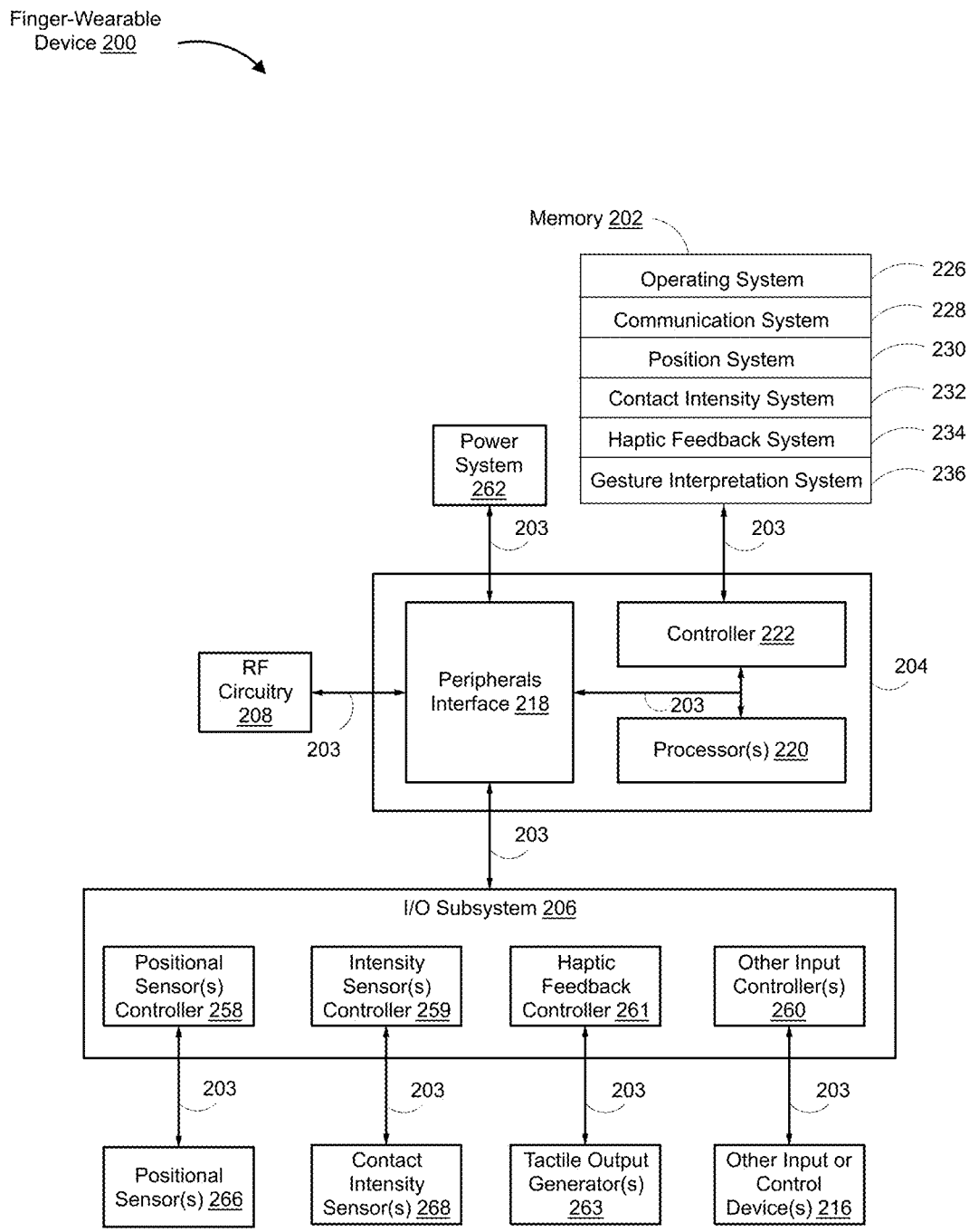
FIG. 2 is a block diagram of an example of a finger-wearable device in accordance with some implementations.
Figure 3A:
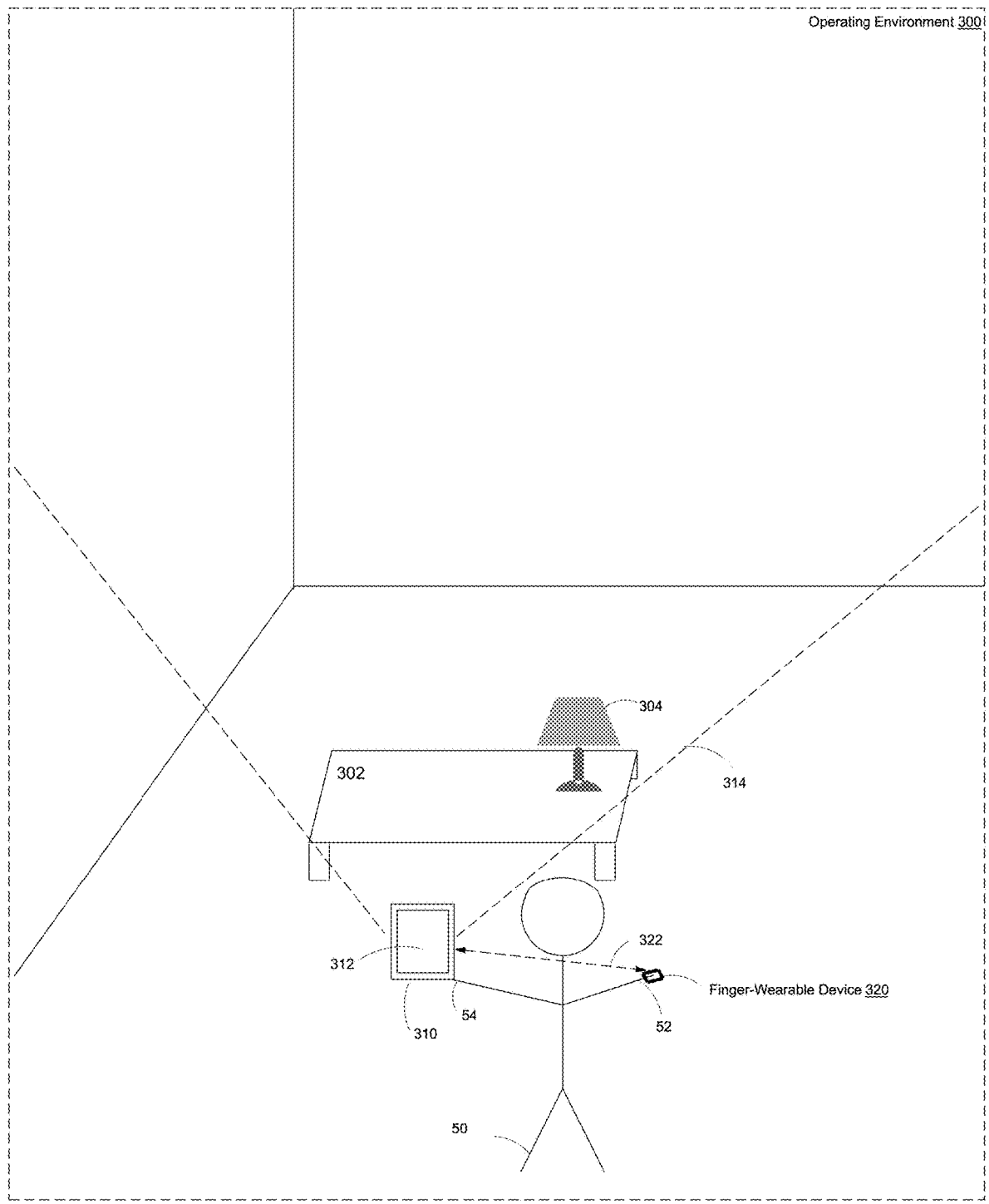
FIGS. 3A-3W are examples of an electronic device mapping a computer-generated trackpad to a content manipulation region in accordance with some implementations.
Figure 3B:
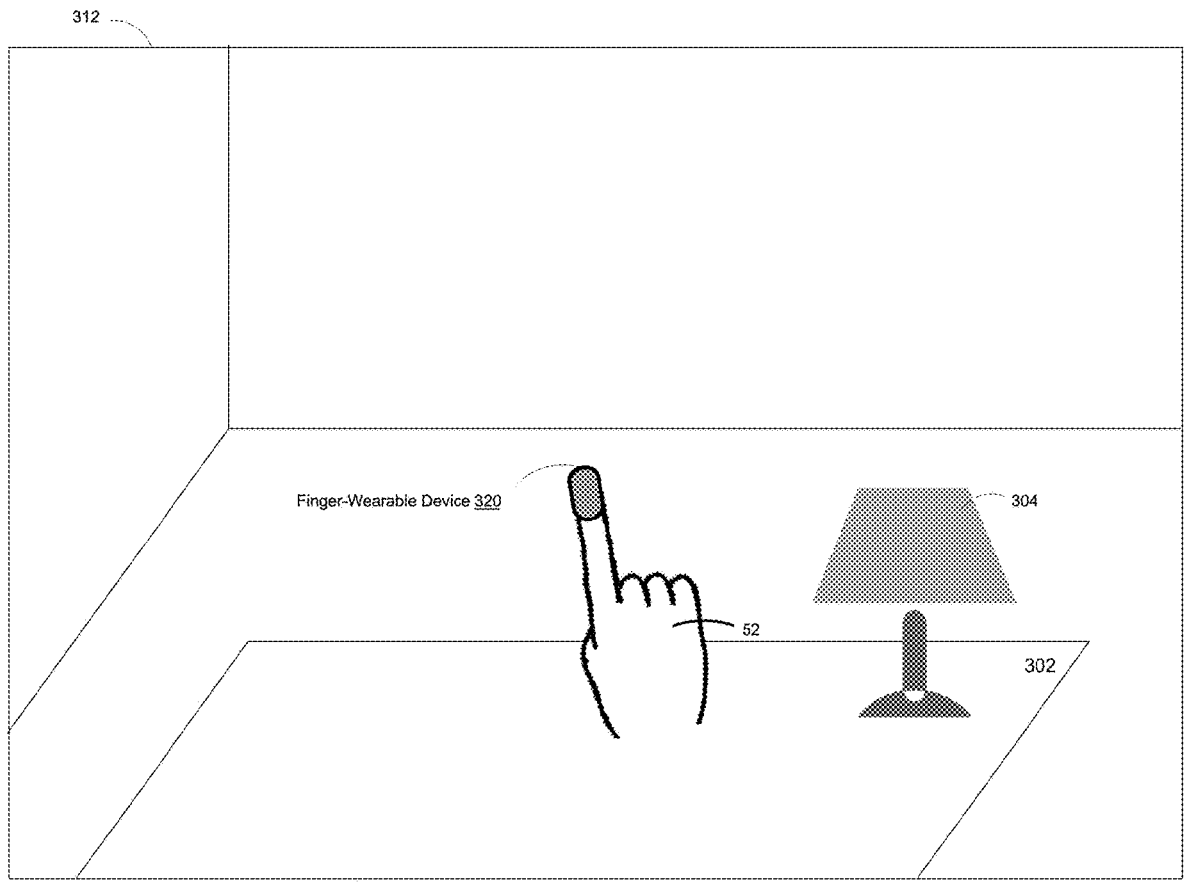
Figure 3C:
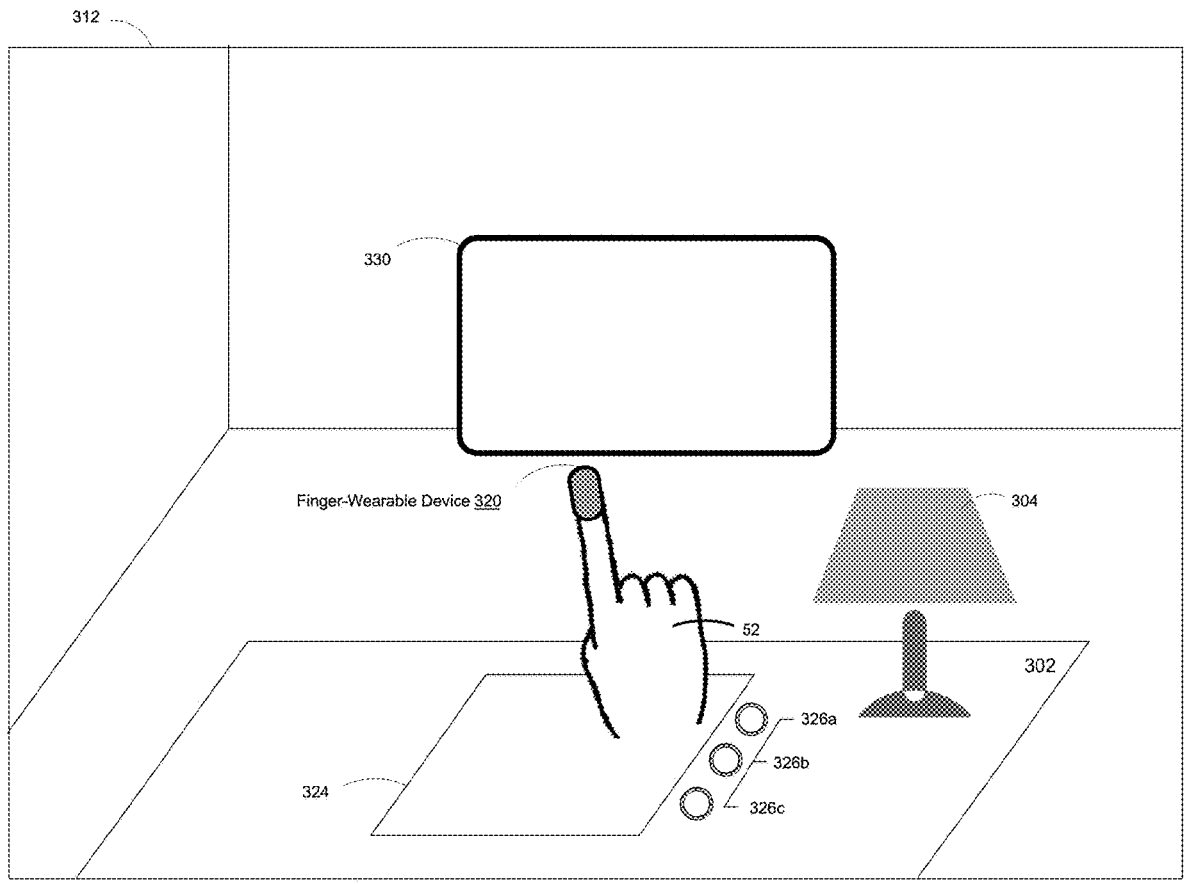
Figure 3D:
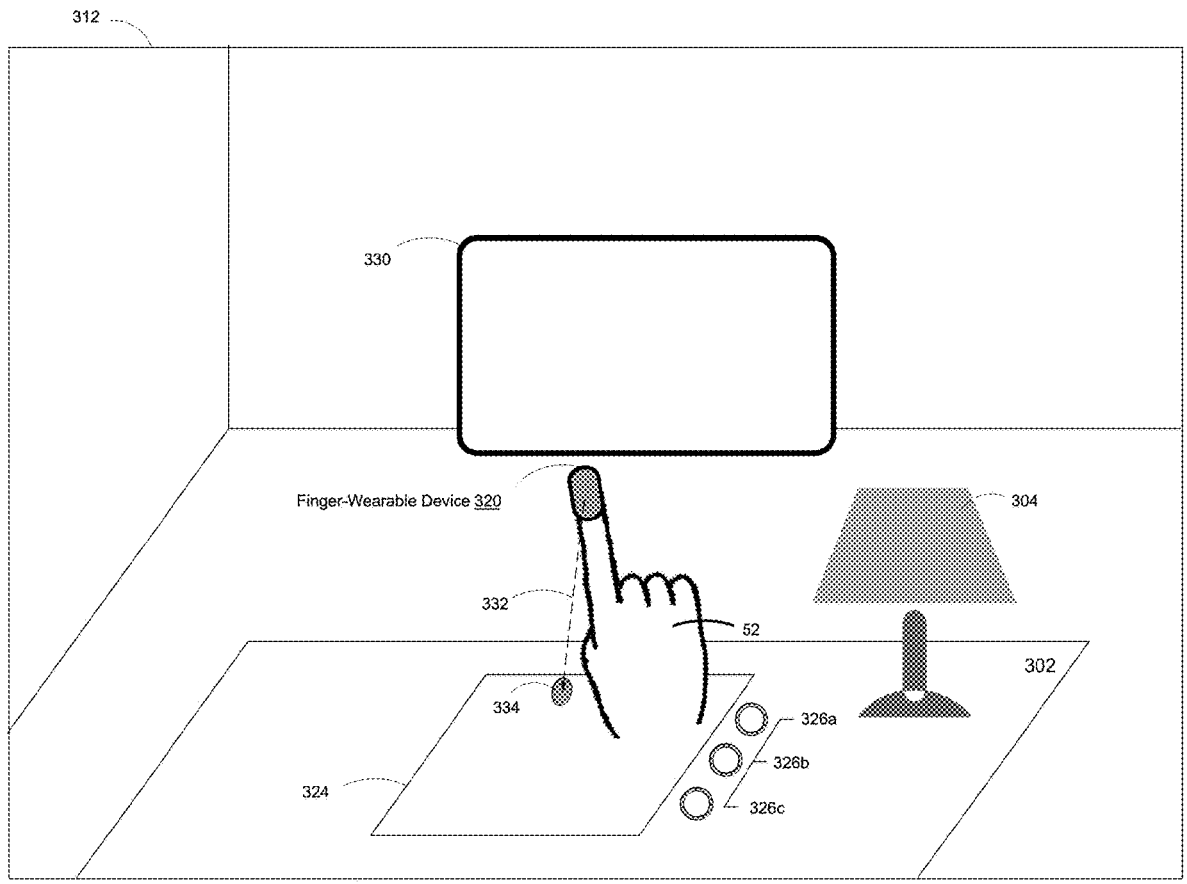
Figure 3E:
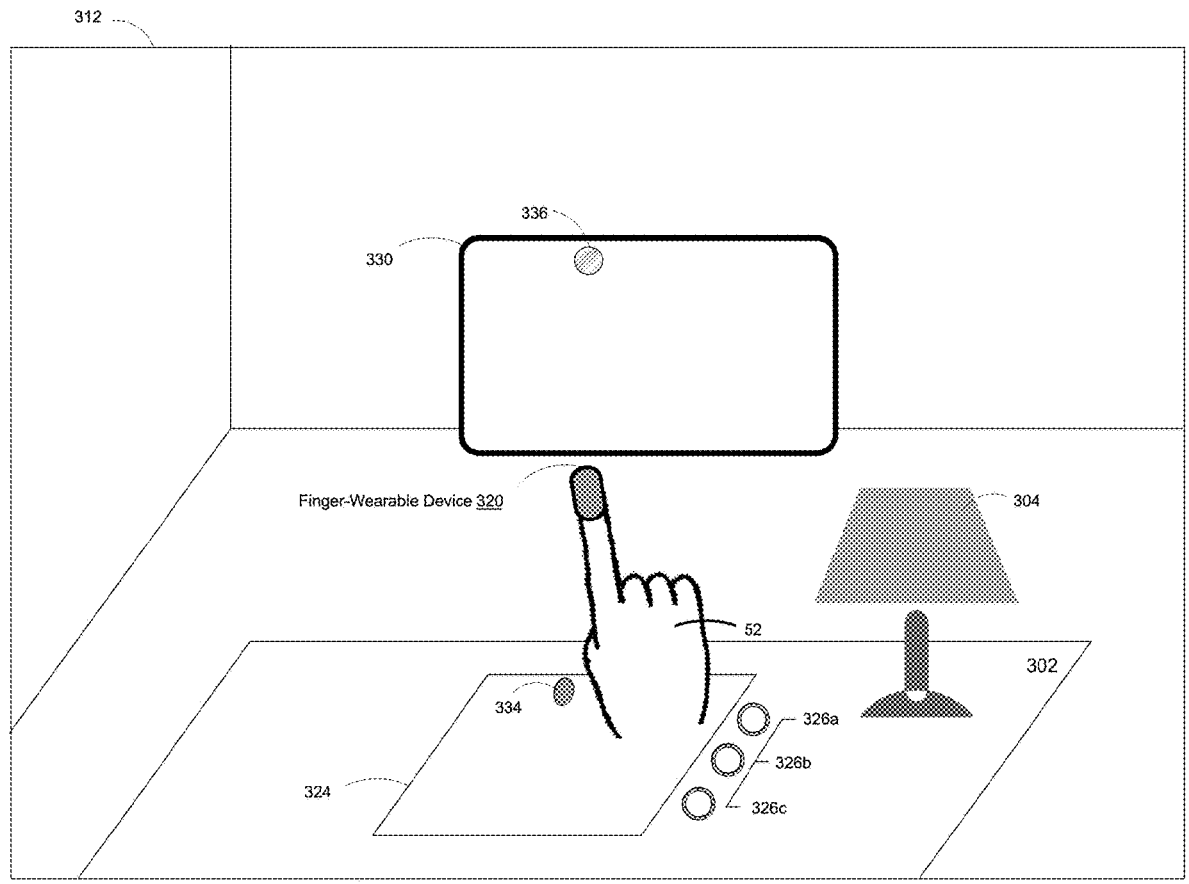
Figure 3F:
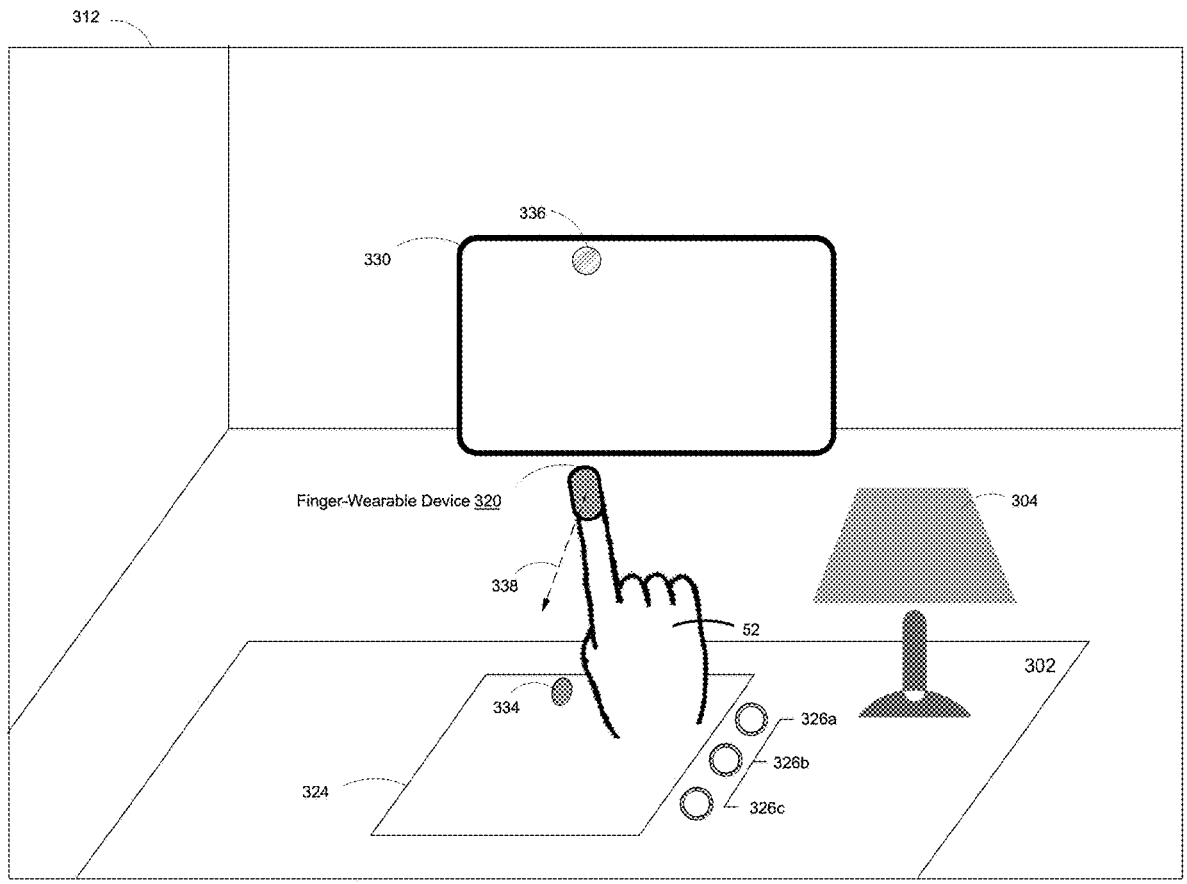
Figure 3G:
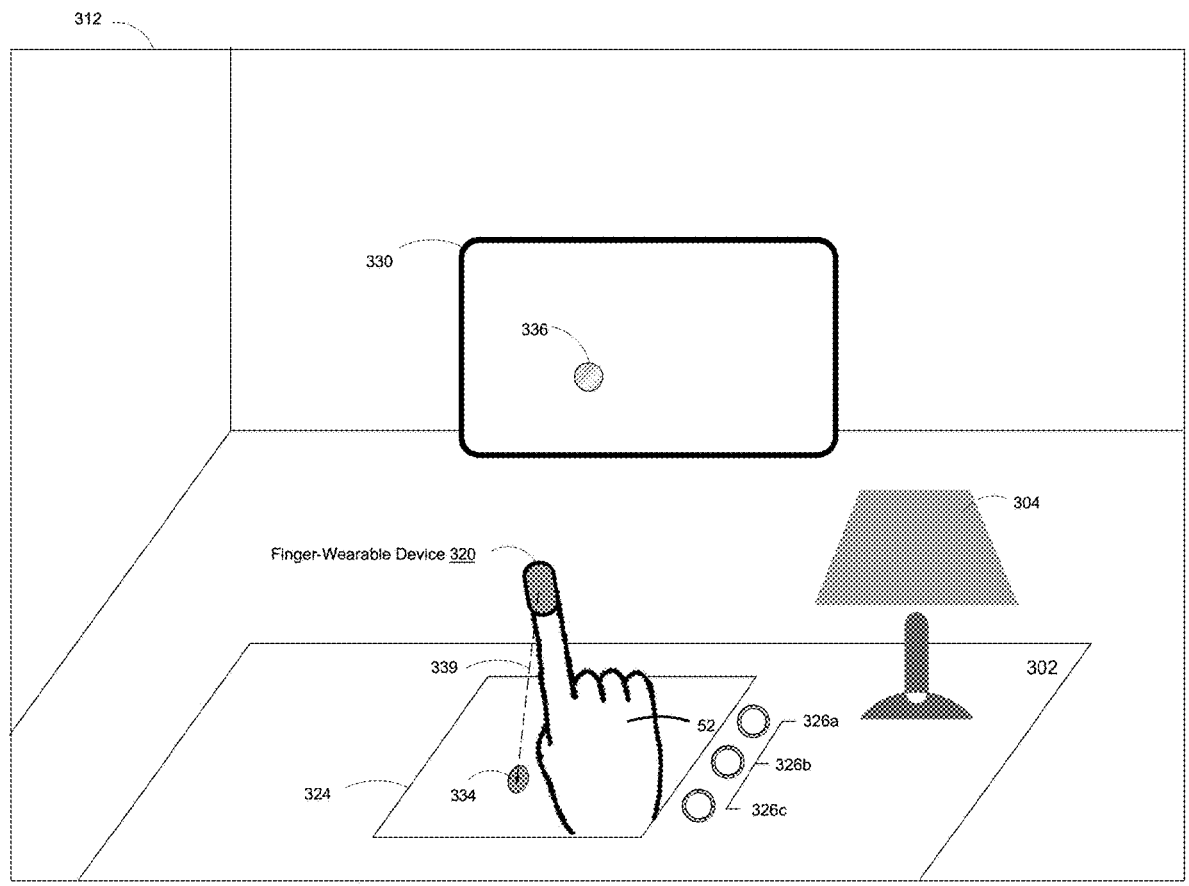
Figure 3H:
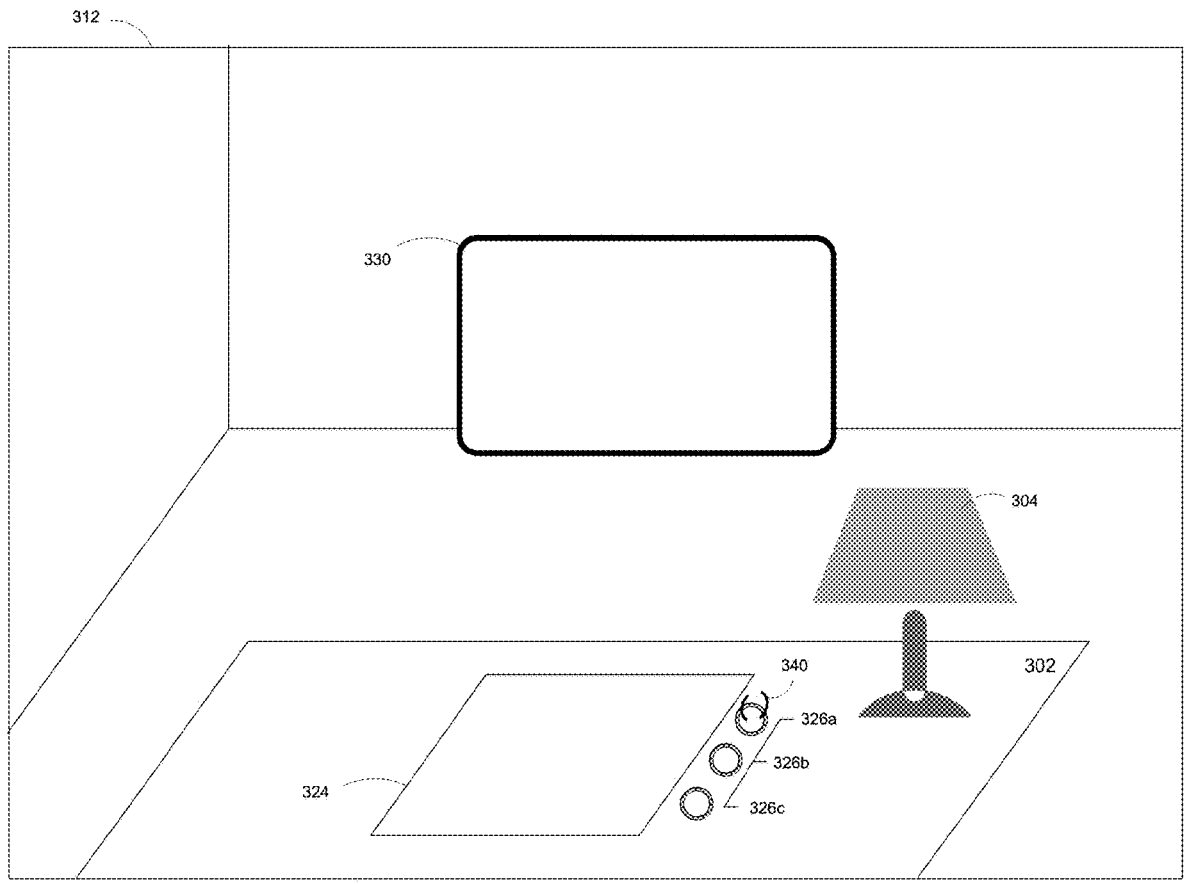
Figure 3I:
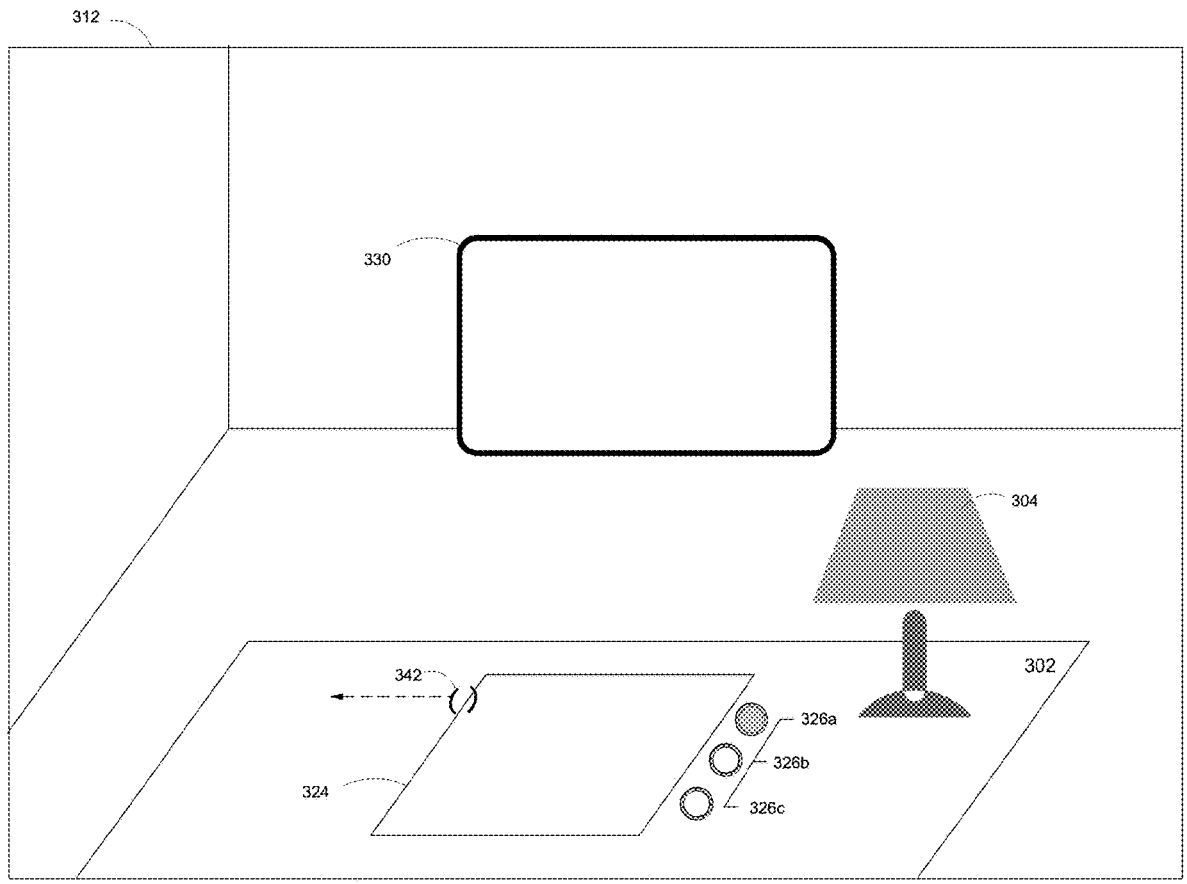
Figure 3J:
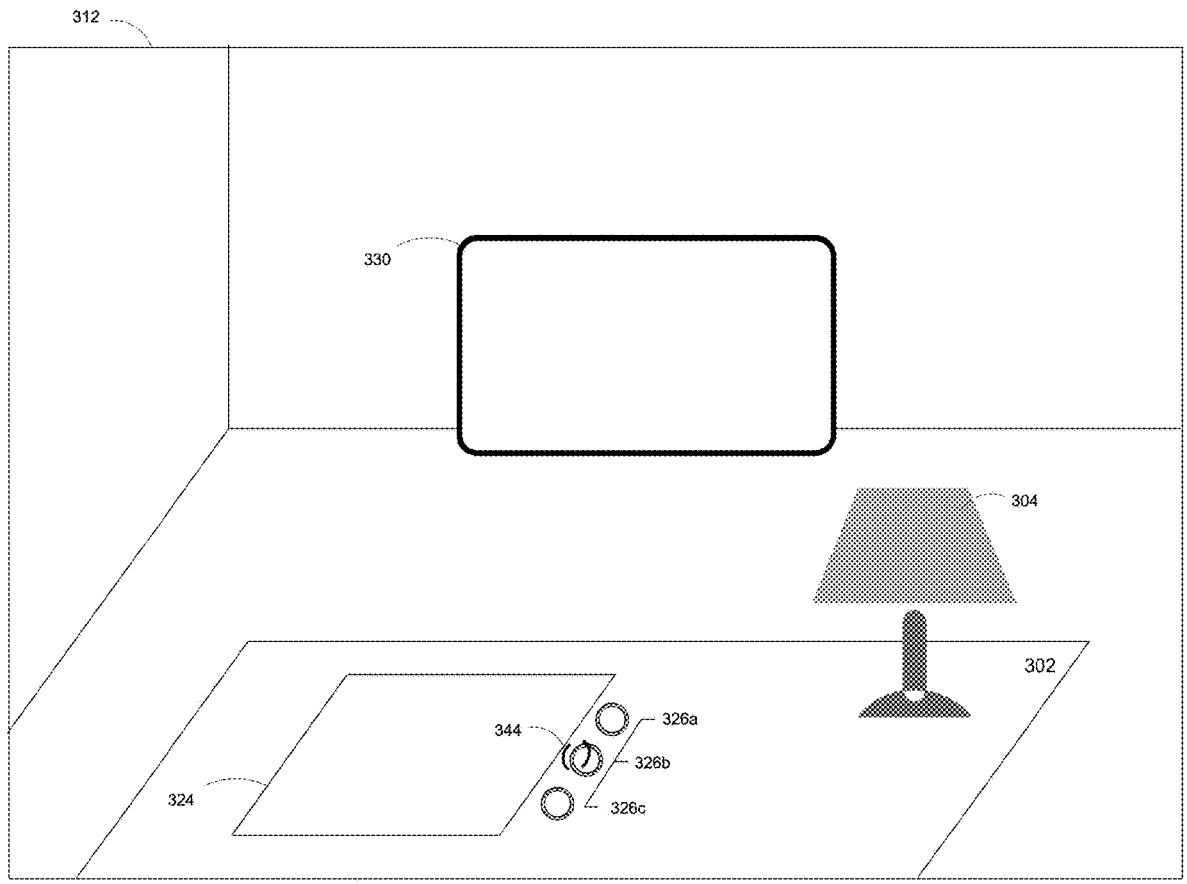
Figure 3K:
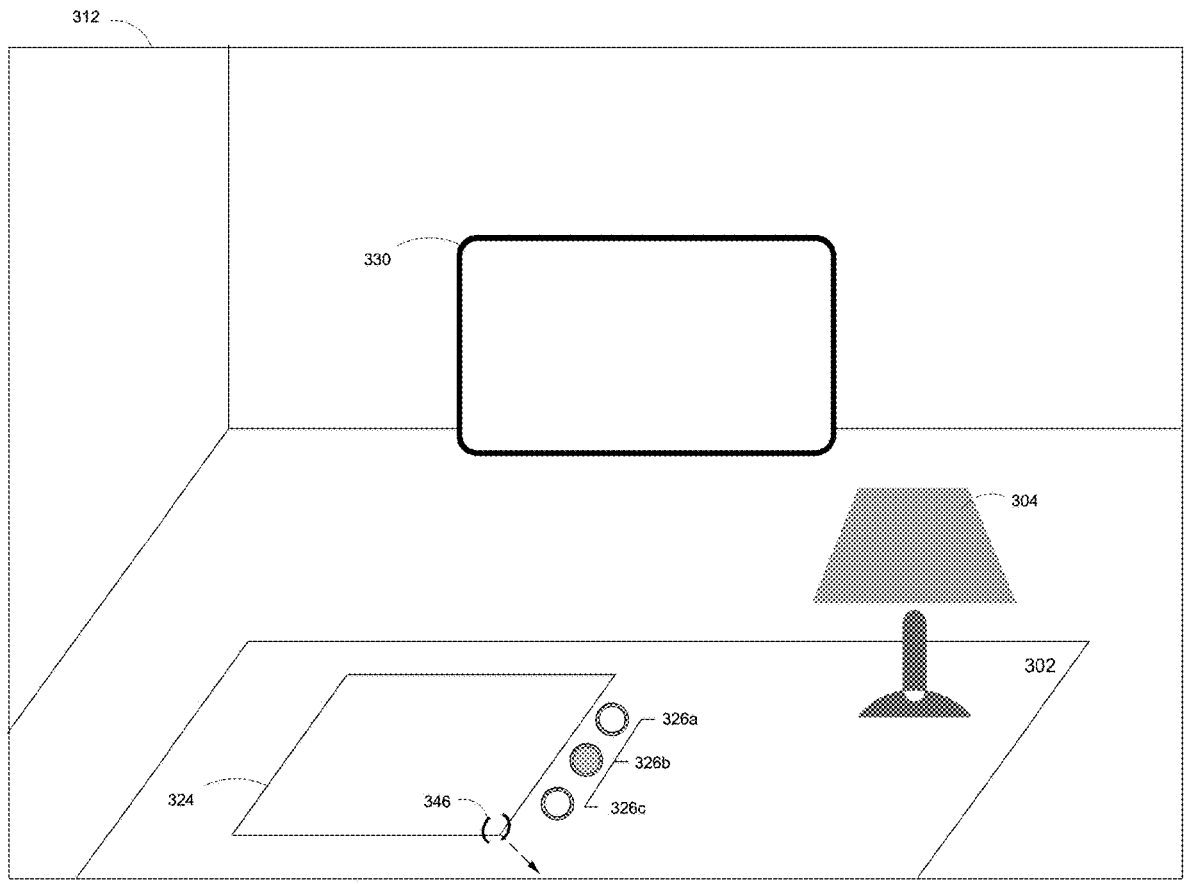
Figure 3L:
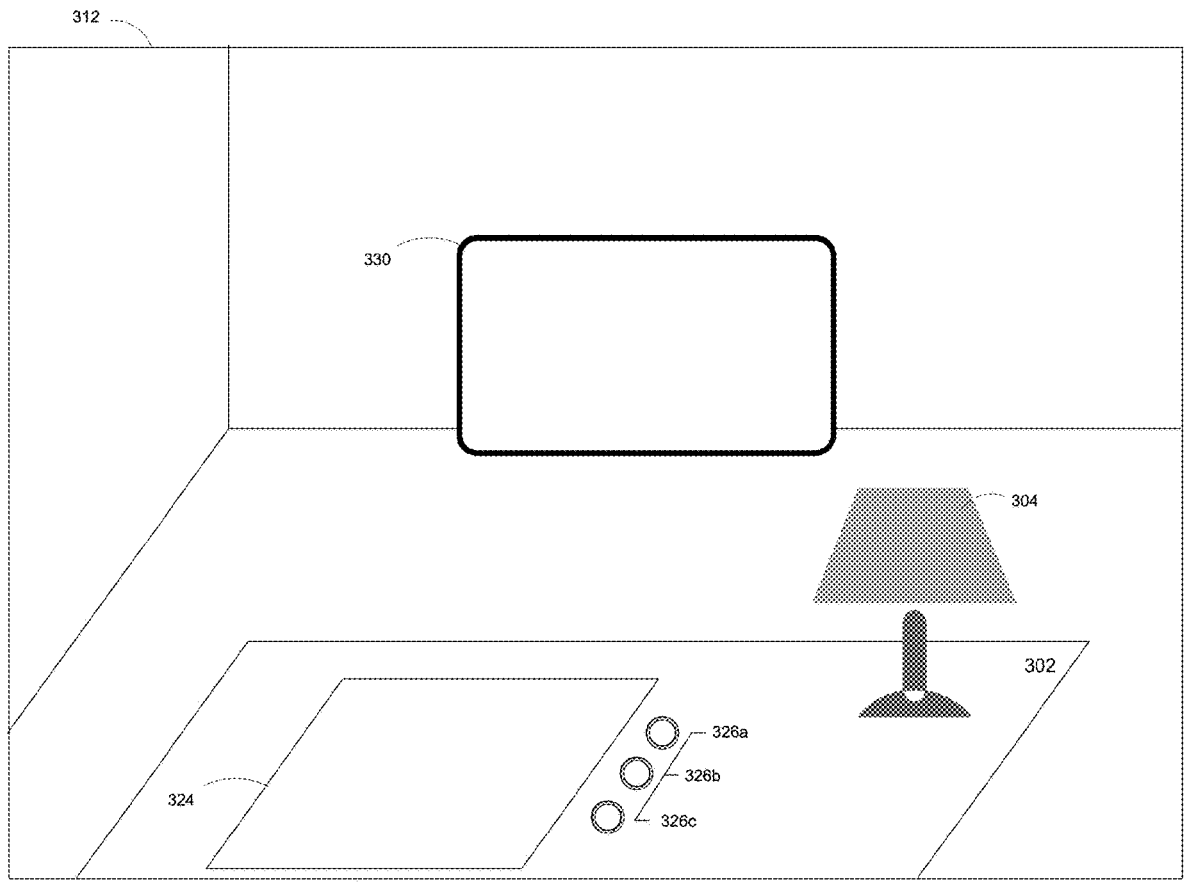
Figure 3M:
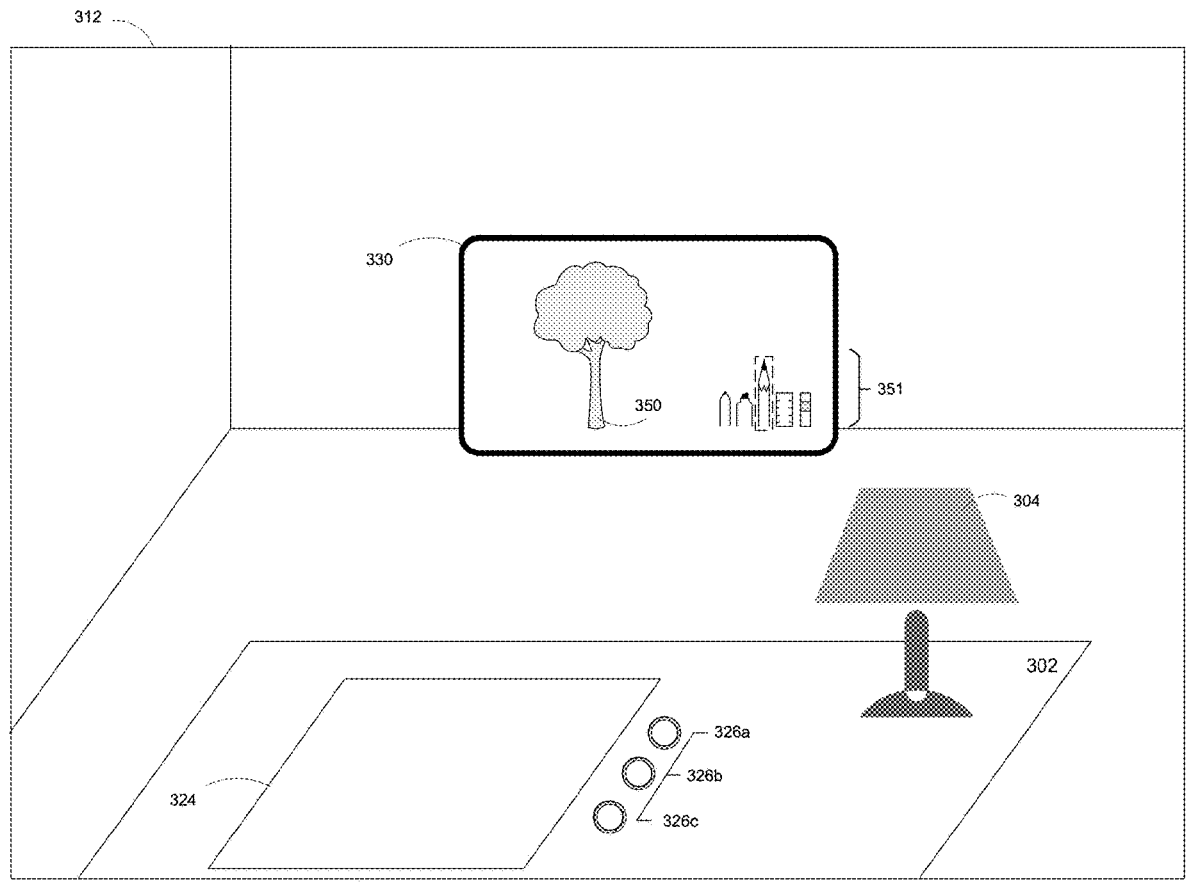
Figure 3N:
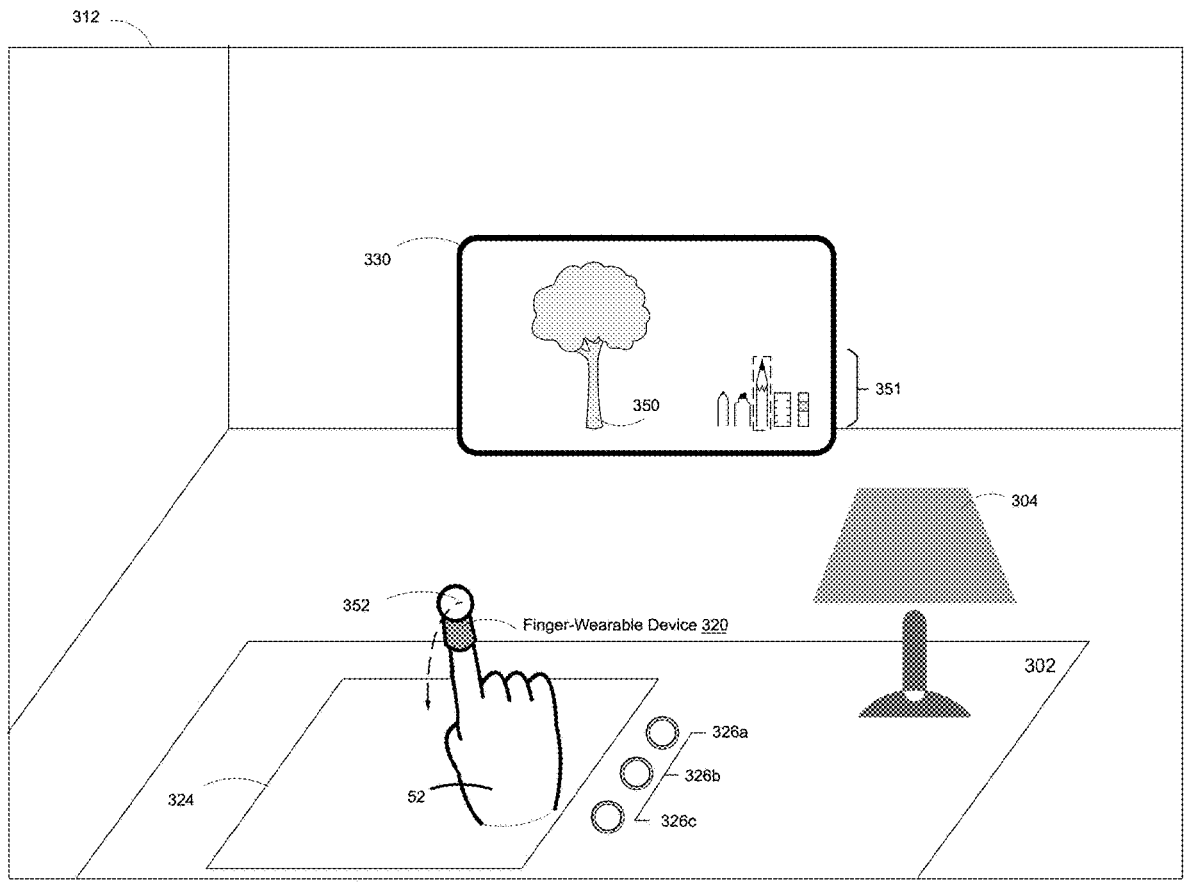
Figure 3O:
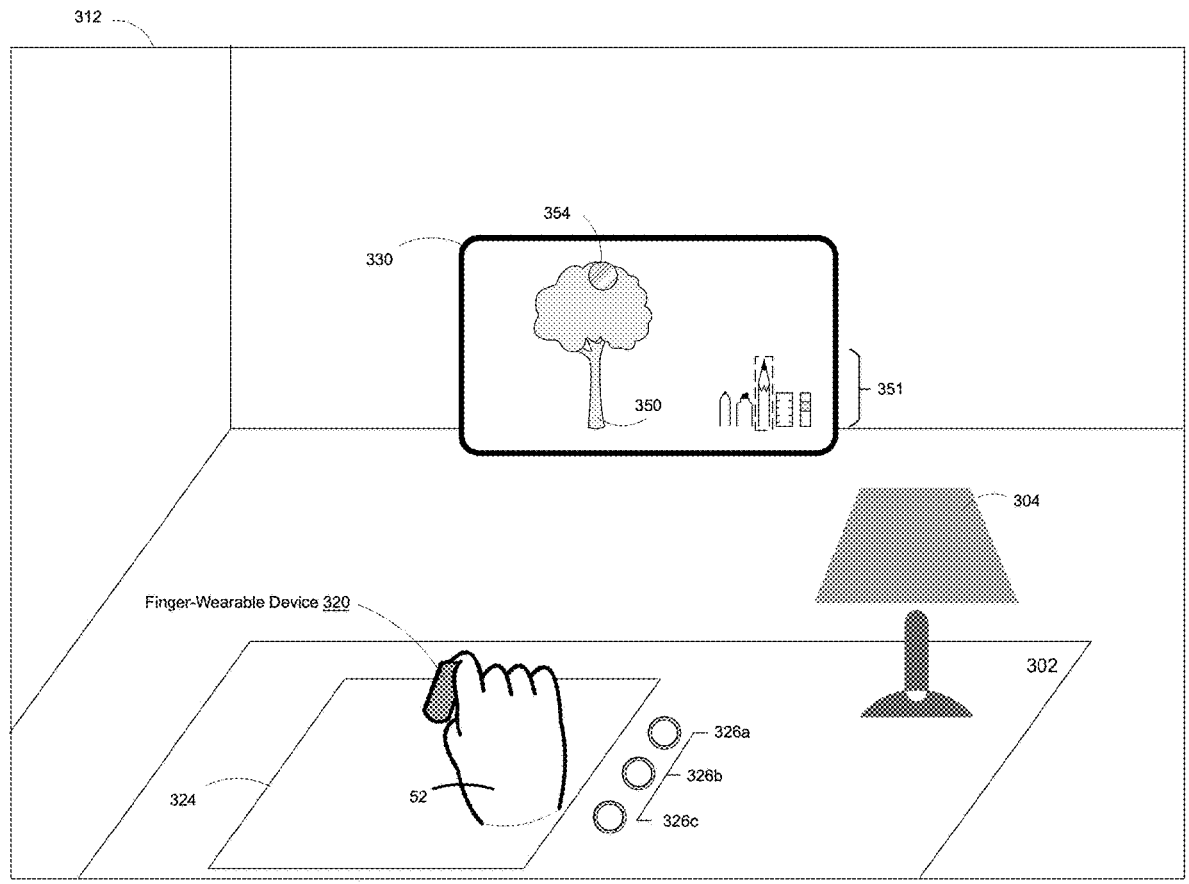
Figure 3P:
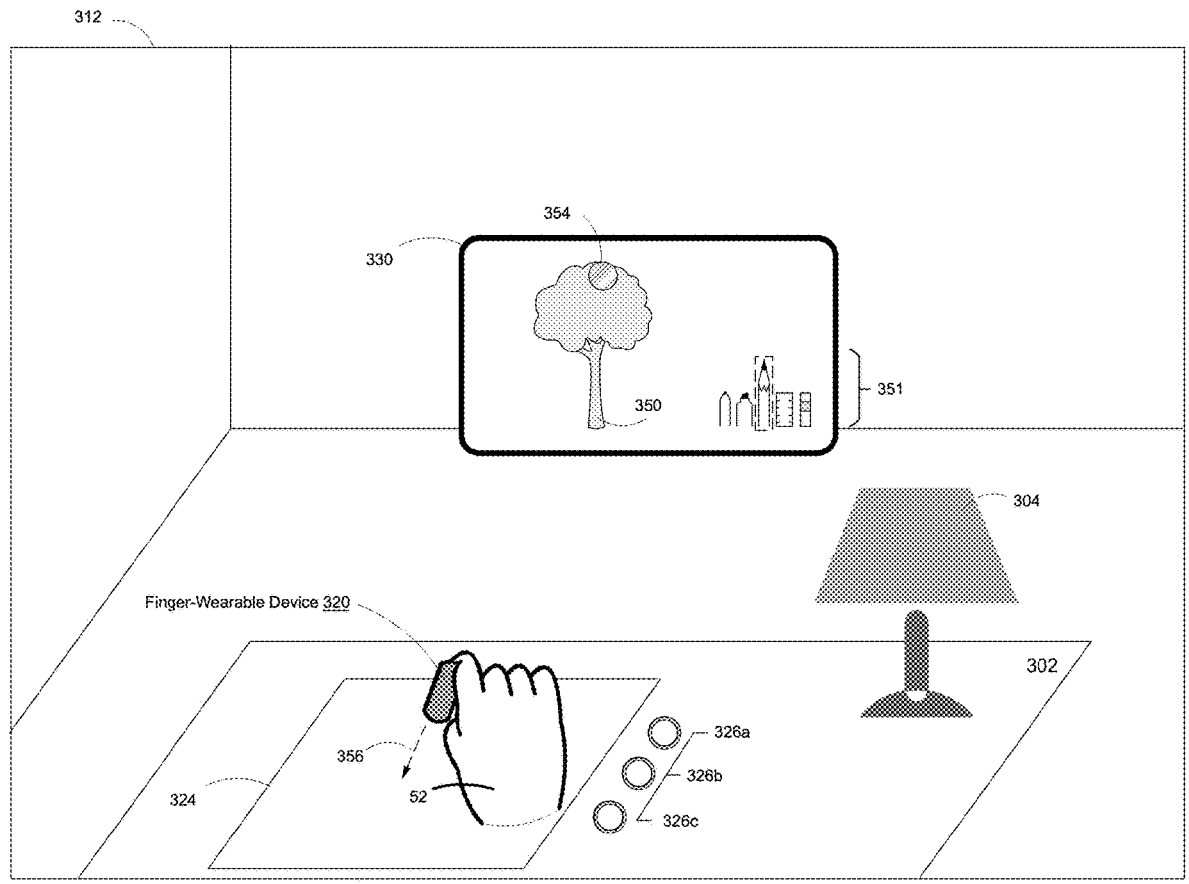
Figure 3Q:
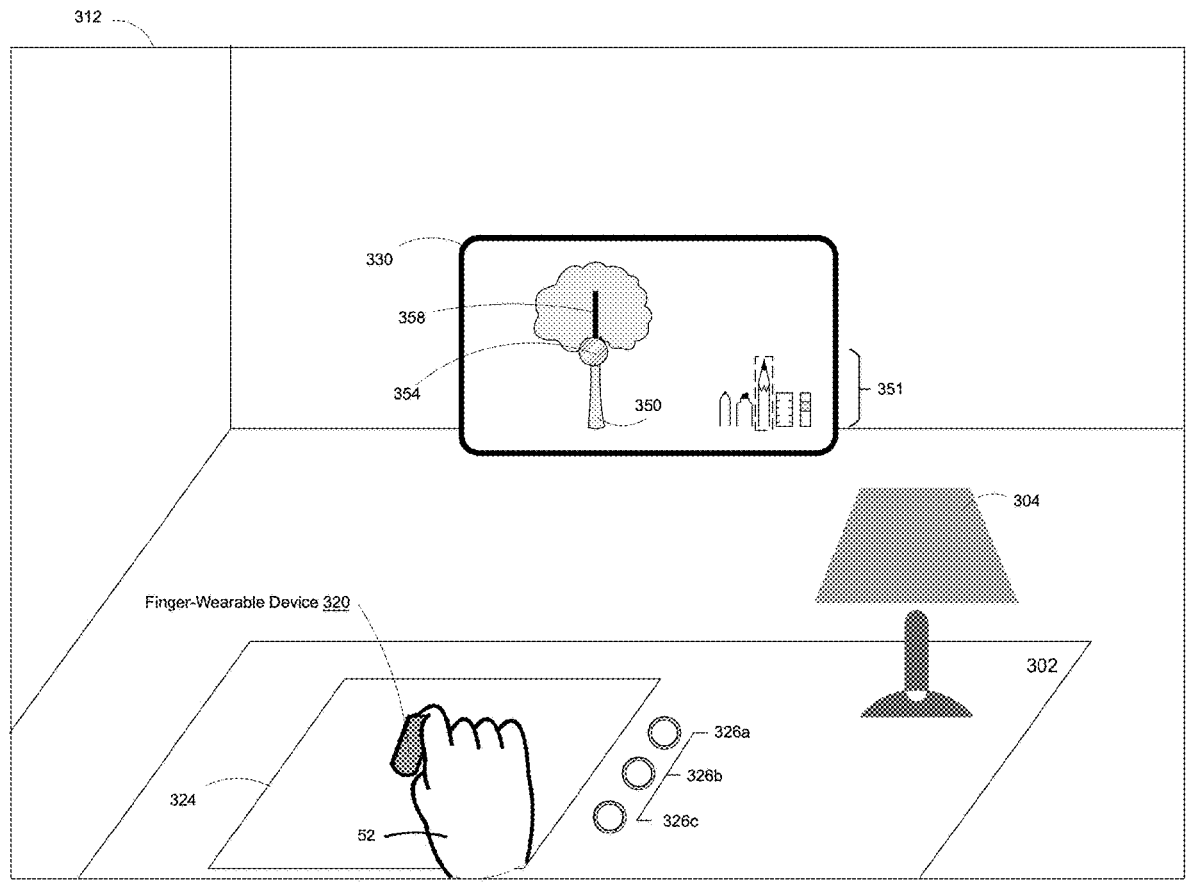
Figure 3R:
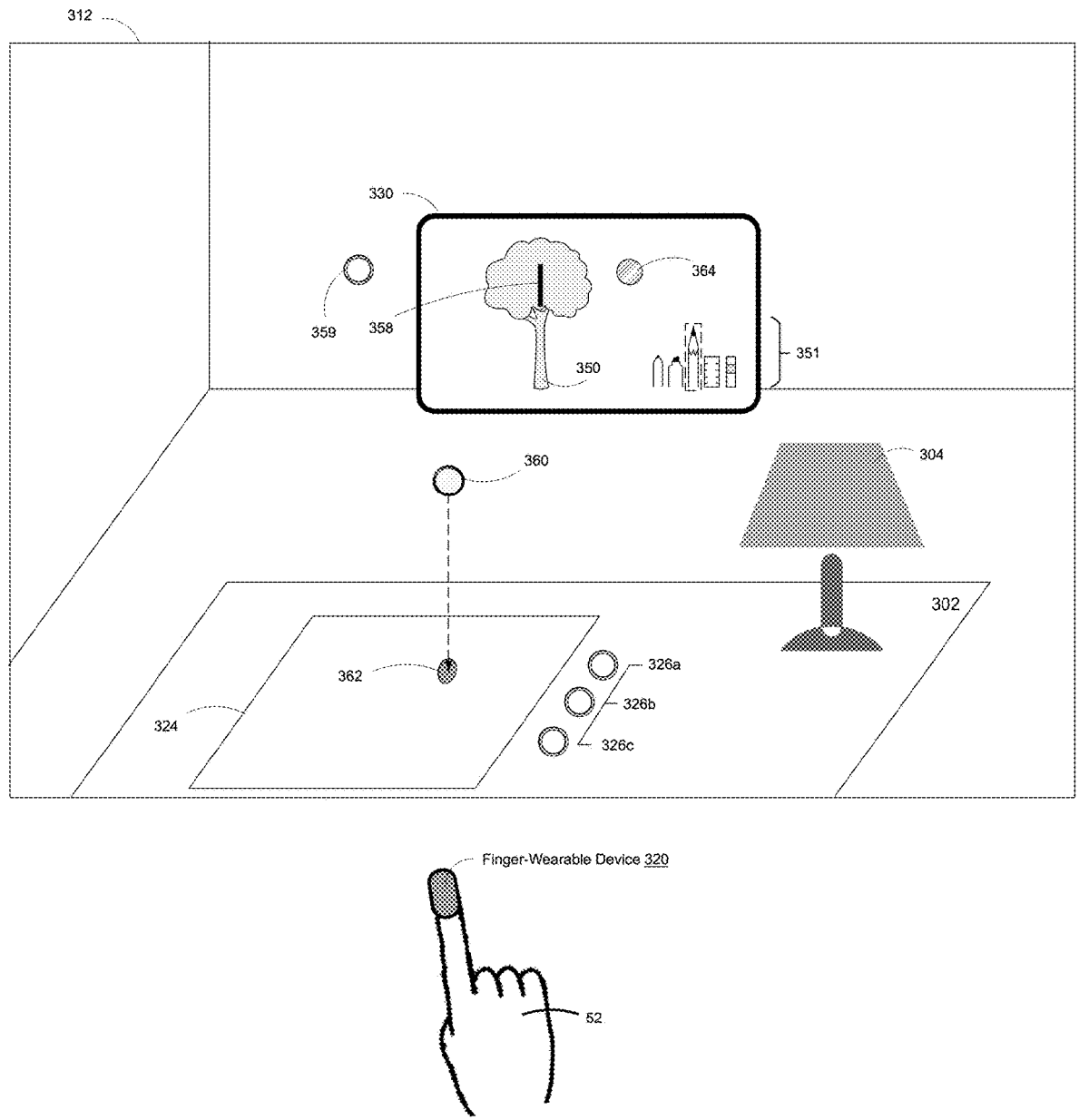
Figure 3S:
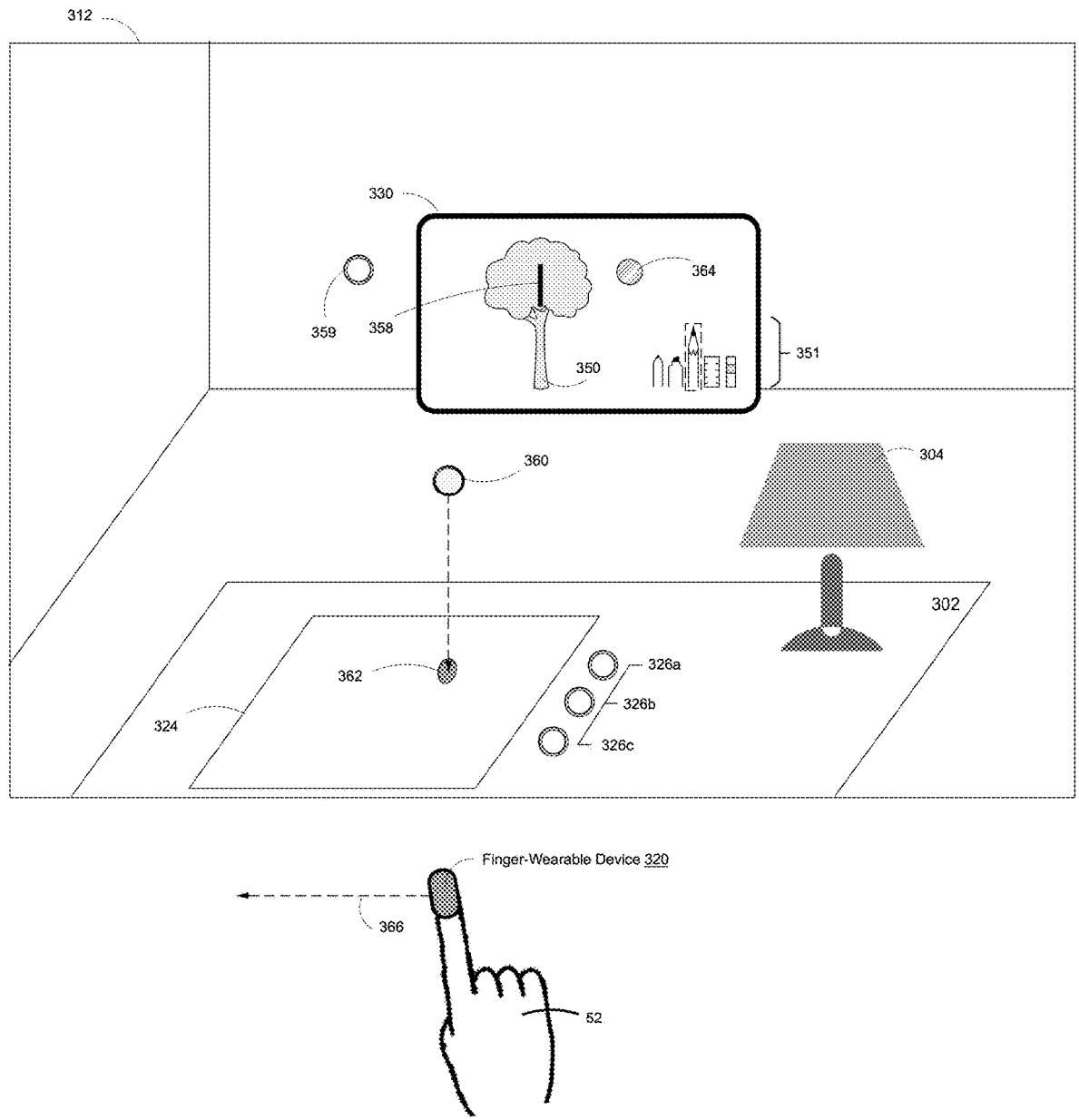
Figure 3T:
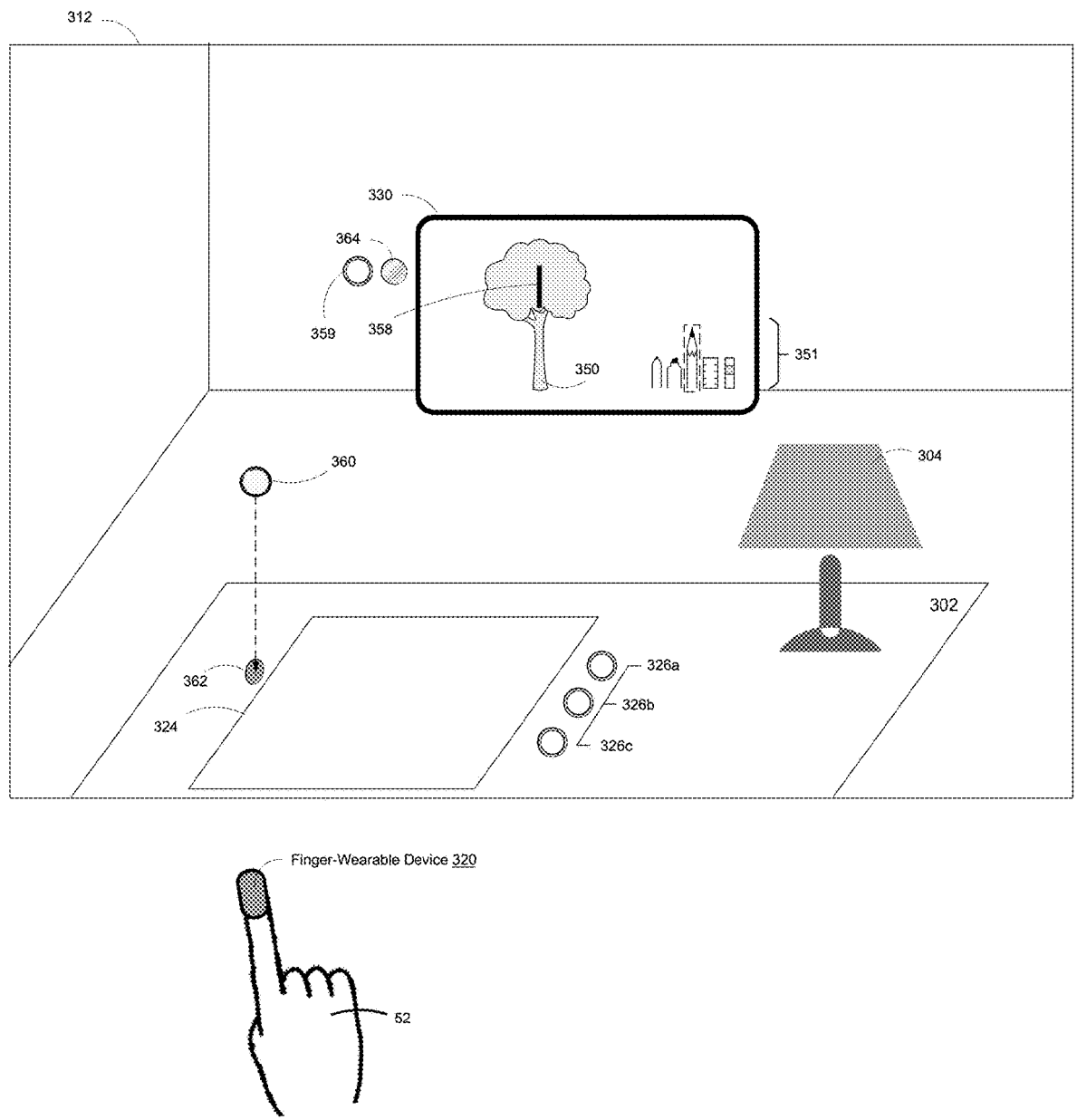
Figure 3U:
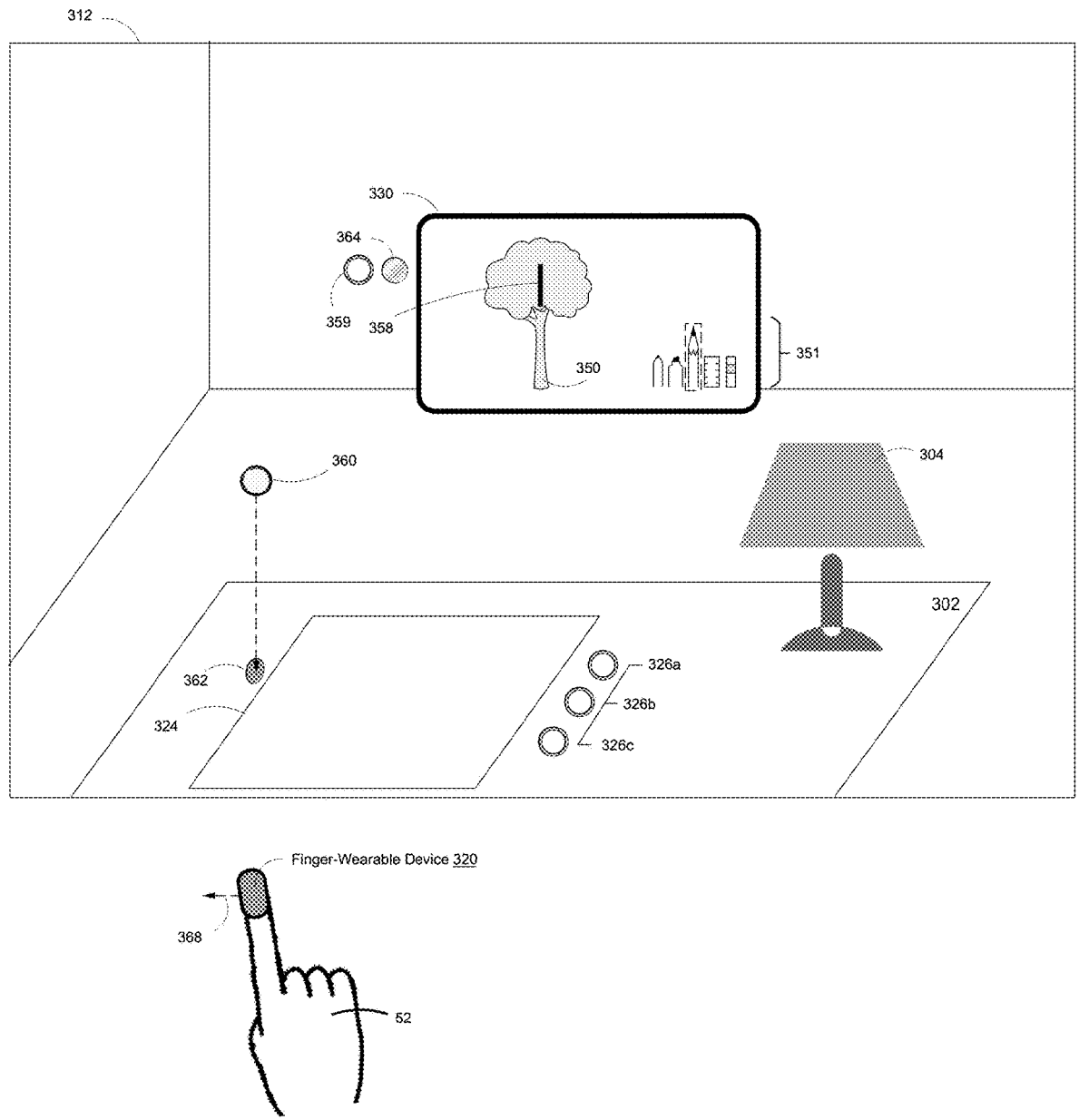
Figure 3V:
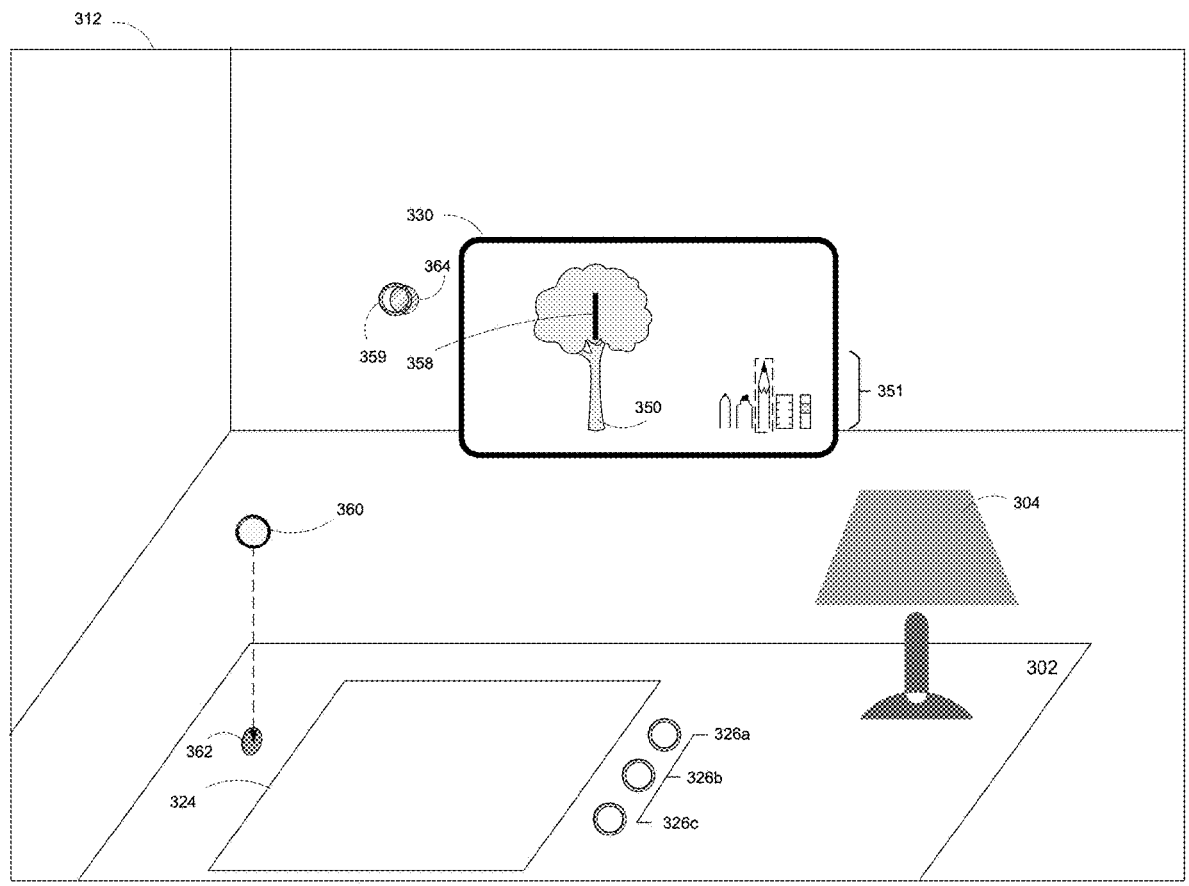
Figure 3V:
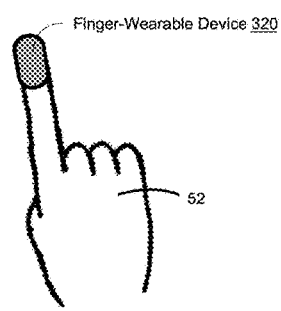
Figure 3W:
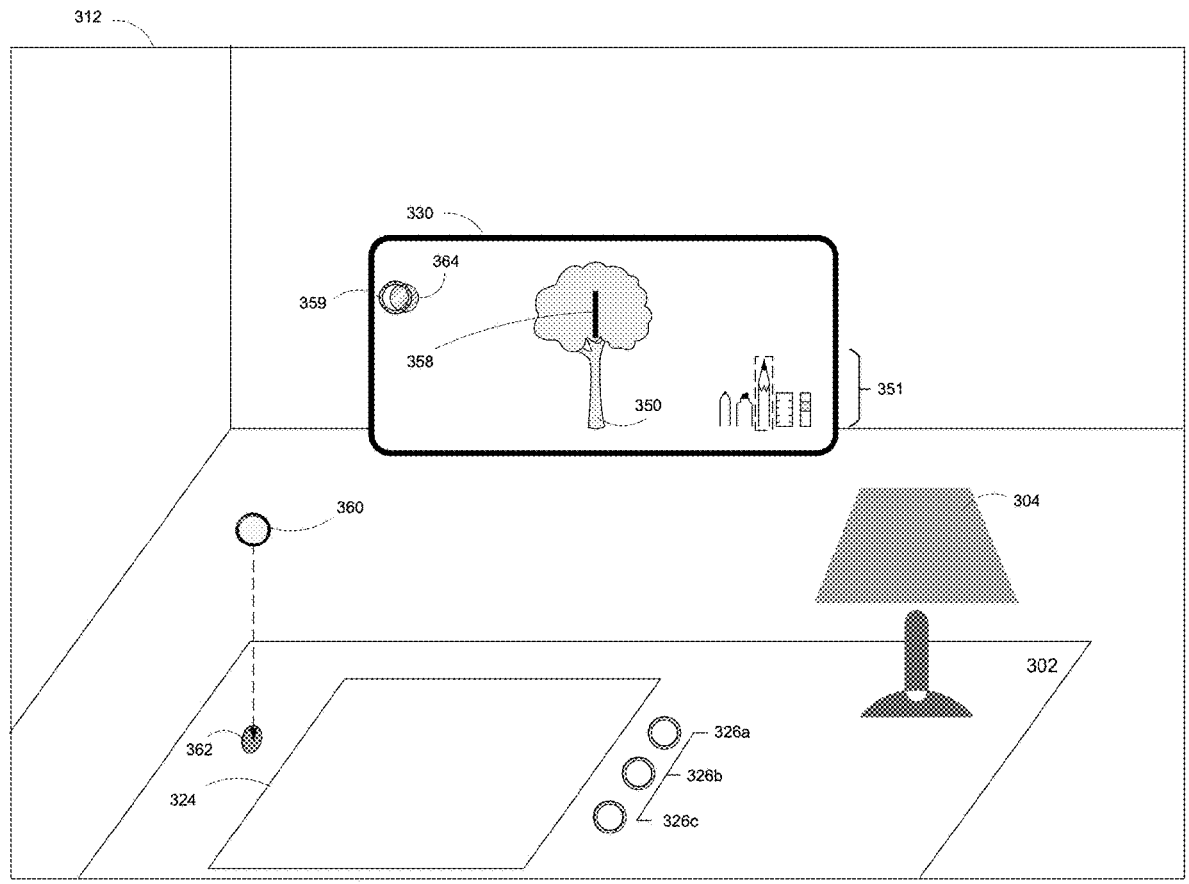
Figure 3W:
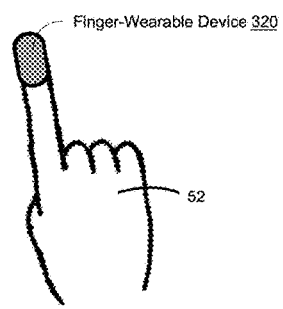

The electronic device 100 includes a communication interface 190 that is provided to communicate with a finger-wearable device, such as the finger-wearable device 200 illustrated in FIG. 2 or the finger-wearable device 320 in FIGS. 3A-3W. For example, the communication interface 190 corresponds to one of a BLUETOOTH interface, IEEE 802.11x interface, near field communication (NFC) interface, and/or the like. According to various implementations, the electronic device 100 obtains finger manipulation data from the finger-wearable device via the communication interface 190, as will be further described below.

FIG. 2 is a block diagram of an example of a finger-wearable device 200. The finger-wearable device 200 includes memory 202 (which optionally includes one or more computer readable storage mediums), memory controller 222, one or more processing units (CPUs) 220, peripherals interface 218, RF circuitry 208, and input/output (I/O) subsystem 206. These components optionally communicate over one or more communication buses or signal lines 203. One of ordinary skill in the art will appreciate that the finger-wearable device 200 illustrated in FIG. 2 is one example of a finger-wearable device, and that the finger-wearable device 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

The finger-wearable device 200 includes a power system 262 for powering the various components. The power system 262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The memory 202 optionally includes high-speed random-access memory and optionally also includes non-volatile memory, such as one or more flash memory devices, or other non-volatile solid-state memory devices. Access to memory 202 by other components of the finger-wearable device 200, such as CPU(s) 220 and the peripherals interface 218, is, optionally, controlled by memory controller 222.

The peripherals interface 218 can be used to couple input and output peripherals of the finger-wearable device 200 to the CPU(s) 220 and the memory 202. The one or more processors 220 run or execute various software programs and/or sets of instructions stored in memory 202 to perform various functions for the finger-wearable device 200 and to process data.

In some implementations, the peripherals interface 218, the CPU(s) 220, and the memory controller 222 are, optionally, implemented on a single chip, such as chip 204. In some implementations, they are implemented on separate chips.

The RF (radio frequency) circuitry 208 receives and sends RF signals, also called electromagnetic signals. The RF circuitry 208 converts electrical signals to/from electromagnetic signals and communicates with the electronic device 100 or 310, communications networks, and/or other communications devices via the electromagnetic signals. The RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 206 couples input/output peripherals on the finger-wearable device 200, such as other input or control devices 216, with the peripherals interface 218. The I/O subsystem 206 optionally includes one or more positional sensor controllers 258, one or more intensity sensor controllers 259, a haptic feedback controller 261, and one or more other input controllers 260 for other input or control devices. The one or more other input controllers 260 receive/send electrical signals from/to other input or control devices 216. The other input or control devices 216 optionally include physical buttons (e.g., push buttons, rocker buttons, etc.), dials, slider switches, click wheels, and so forth. In some implementations, the other input controller(s) 260 are, optionally, coupled with any (or none) of the following: an infrared port and/or a USB port.

In some implementations, the finger-wearable device 200 includes one or more positional sensors 266 that output positional data associated with the finger-wearable device 200. The positional data is indicative of a position, orientation, or movement of the finger-wearable device 200, such as a rotational movement or translational movement of the finger-wearable device 200. For example, the positional sensor(s) 266 include an inertial measurement unit (IMU) that provides 3D rotational data, such as roll, pitch, and yaw information. To that end, the IMU may include a combination of an accelerometer, gyroscopes, and magnetometers. As another example, the positional sensor(s) 266 include a magnetic sensor that provides 3D positional data and/or 3D orientation data, such as the position of the finger-wearable device 200. For example, the magnetic sensor measures weak magnetic fields in order to determine a position of the finger-wearable device 200.

In some implementations, the finger-wearable device 200 includes one or more contact intensity sensors 268 for detecting intensity (e.g., force or pressure) of a contact of a finger, wearing the finger-wearable device 200, on a physical object. The one or more contact intensity sensors 268 output contact intensity data associated with the finger-wearable device 200. As one example, the contact intensity data is indicative of the force or pressure of a tap gesture associated with a finger, which is wearing the finger-wearable device 200, tapping on a surface of a physical table. The one or more contact intensity sensors 268 may include an interferometer. The one or more contact intensity sensors 268 may include one or more piezoresistive strain gauges, capacitive force sensors, electric force sensors, piezoelectric force sensors, optical force sensors, capacitive touch-sensitive surfaces, or other intensity sensors.

The finger-wearable device 200 optionally includes one or more tactile output generators 263 for generating tactile outputs on the finger-wearable device 200. In some implementations, the term "tactile output" refers to physical displacement of an accessory (e.g., the finger-wearable device 200) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the finger-wearable device 200) is, optionally, interpreted by the user as a "click" of a physical actuator button. In some cases, a user will feel a tactile sensation such as a "click" even when there is no movement of a physical actuator button associated with the finger-wearable device that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

FIG. 2 shows the tactile output generator(s) 263 coupled with a haptic feedback controller 261. The tactile output generator(s) 263 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The tactile output generator(s) 263 receive tactile feedback generation instructions from a haptic feedback system 234 and generates tactile outputs on the finger-wearable device 200 that are capable of being sensed by a user of the finger-wearable device 200.

In some implementations, the software components stored in the memory 202 include an operating system 226, a communication system (or set of instructions) 228, a position system (or set of instructions) 230, a contact intensity system (or set of instructions) 232, a haptic feedback system (or set of instructions) 234, and a gesture interpretation system (or set of instructions) 236. Furthermore, in some implementations, the memory 202 stores device/global internal state associated with the finger-wearable device. The device/global internal state includes one or more of: sensor state, including information obtained from the finger wearable device's various sensors and other input or control devices 216; positional state, including information regarding the finger-wearable device's position (e.g., position, orientation, tilt, roll and/or distance) relative to an electronic device (e.g., the electronic device 100); and location information concerning the finger-wearable device's absolute position.

The operating system 226 includes various software components and/or drivers for controlling and managing general system tasks (e.g., memory management, power management, etc.) and facilitates communication between various hardware and software components.

The communication system 228 facilitates communication with other devices (e.g., the electronic device 100 or the electronic device 310), and also includes various software components (e.g., for handling data received by the RF circuitry 208) that are adapted for coupling directly to other devices or indirectly over a network (e.g., the Internet, wireless LAN, etc.).

The position system 230, in conjunction with positional data from the one or more positional sensor(s) 266, optionally detects positional information concerning the finger-wearable device 200. The position system 230 optionally includes software components for performing various operations related to detecting the position of the finger-wearable device 200 and detecting changes to the position of the finger-wearable device 200 in a particular frame of reference. In some implementations, the position system 230 detects the positional state of the finger-wearable device 200 relative to the electronic device and detects changes to the positional state of the finger-wearable device 200 relative to the electronic device. As noted above, in some implementations, the electronic device 100 or 310 determines the positional state of the finger-wearable device 200 relative to the electronic device and changes to the positional state of the finger-wearable device 200 using information from the position system 230.

The contact intensity system 232, in conjunction with contact intensity data from the one or more contact intensity sensor(s) 268, optionally detects contact intensity information associated with the finger-wearable device 200. The contact intensity system 232 includes software components for performing various operations related to detection of contact, such as detecting the intensity and/or duration of a contact between the finger-wearable device 200 and a desk surface. Determining movement of the point of contact, which is represented by a series of contact intensity data, optionally includes determining speed (magnitude), velocity (magnitude and direction), and/or an acceleration (a change in magnitude and/or direction) of the point of contact.

The haptic feedback system 234 includes various software components for generating instructions used by the tactile output generator(s) 263 to produce tactile outputs at one or more locations on finger-wearable device 200 in response to user interactions with the finger-wearable device 200.

The finger-wearable device 200 optionally includes a gesture interpretation system 236. The gesture interpretation system 236 coordinates with the position system 230 and/or the contact intensity system 232 in order to determine a gesture performed by the finger-wearable device. For example, the gesture includes one or more of: a pinch gesture, a pull gesture, a pinch and pull gesture, a rotational gesture, a tap gesture, and/or the like. In some implementations, the finger-wearable device 200 does not include a gesture interpretation system, and an electronic device or a system (e.g., the gesture interpretation system 445 in FIG. 4) determines a gesture performed by the finger-wearable device 200 based on finger manipulation data from the finger-wearable device 200. In some implementations, a portion of the gesture determination is performed at the finger-wearable device 200, and a portion of the gesture determination is performed at an electronic device/system. In some implementations, the gesture interpretation system 236 determines a time duration associated with a gesture. In some implementations, the gesture interpretation system 236 determines a contact intensity associated with a gesture, such as an amount of pressure associated with a finger (wearing the finger-wearable device 200) tapping on a physical surface.

Each of the above identified modules and applications correspond to a set of executable instructions for performing one or more functions described above and the methods described in this application (e.g., the computer-implemented methods and other information processing methods described herein). These systems (i.e., sets of instructions) need not be implemented as separate software programs, procedures or modules, and thus various subsets of these modules are, optionally, combined or otherwise re-arranged in various embodiments. In some implementations, the memory 202 optionally stores a subset of the systems and data structures identified above. Furthermore, the memory 202 optionally stores additional systems and data structures not described above.

FIGS. 3A-3W are examples of an electronic device 310 mapping a computer-generated trackpad to a content manipulation region in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As illustrated in FIG. 3A, an electronic device 310 is associated with (e.g., operates according to) an operating environment 300. In some implementations, the electronic device 310 is similar to and adapted from the electronic device 100 in FIG. 1. In some implementations, the electronic device 310 generates one of the XR settings described above.

The electronic device 310 includes a display 312 that is associated with a viewable region 314 of the operating environment 300. For example, in some implementations, the electronic device 310 includes an image sensor associated with a field-of-view corresponding to the viewable region 314, and the electronic device 310 composites pass through image data from the image sensor with computer-generated content. As another example, in some implementations, the electronic device 310 includes a see-through display 312 that enables ambient light to enter from a portion of a physical environment that is associated with the viewable region 314. The operating environment 300 includes a physical table 302 and a physical lamp 304 lying atop the physical table 302. The viewable region 314 includes a portion of the physical table 302 and the physical lamp 304.

A finger-wearable device 320 can be worn on a finger of a first hand 52 of a user 50. In some implementations, the finger-wearable device 320 is similar to and adapted from the finger-wearable device 200 illustrated in FIG. 2.

In some implementations, the electronic device 310 includes a communication interface (e.g., the communication interface 190 in FIG. 1) that is provided to communicate with the finger-wearable device 320. The electronic device 310 establishes a communication link with the finger-wearable device 320, as is indicated by a communication link line 322. Establishing the link between the electronic device 310 and the finger-wearable device 320 is sometimes referred to as pairing or tethering. One of ordinary skill in the art will appreciate that the electronic device 310 may communicate with the finger-wearable device 320 according to a variety of communication protocols, such as BLUETOOTH, IEEE 802.11x, NFC, etc. The electronic device 310 obtains finger manipulation data from the finger-wearable device 320 via the communication interface. For example, the electronic device 310 obtains a combination of positional data (e.g., output by positional sensor(s) of the finger-wearable device 320) and contact intensity data (e.g., output by contact intensity sensor(s) of the finger-wearable device 320).

In some implementations, a second hand 54 of the user 50 is holding the electronic device 310. For example, in some implementations, the electronic device 310 corresponds to one of a smartphone, laptop, tablet, etc.

In some implementations, the electronic device 310 corresponds to a head-mountable device (HMD) that includes an integrated display (e.g., a built-in display) that displays a representation of the operating environment 300. In some implementations, the electronic device 310 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 310). For example, in some implementations, the electronic device 310 slides/snaps into or otherwise attaches to the head-mountable enclosure. In some implementations, the display of the device attached to the head-mountable enclosure presents (e.g., displays) the representation of the operating environment 300. For example, in some implementations, the electronic device 310 corresponds to a mobile phone that can be attached to the head-mountable enclosure.

In some implementations, the electronic device 310 includes an image sensor, such as a scene camera. For example, the image sensor obtains image data that characterizes the operating environment 300, and the electronic device 310 composites the image data with computer-generated content in order to generate display data for display on the display 312. The display data may be characterized by an XR environment. For example, the image sensor obtains image data that represents the portion of the physical table 302 and the physical lamp 304, and the generated display data displayed on the display 312 displays respective representations of the portion of the physical table 302 and the physical lamp 304 (See FIG. 3B).

In some implementations, the electronic device 310 includes a see-through display. The see-through display permits ambient light from the physical environment through the see-through display, and the representation of the physical environment is a function of the ambient light. For example, the see-through display is a translucent display, such as glasses with optical see-through. In some implementations, the see-through display is an additive display that enables optical see-through of the physical surface, such as an optical HMD (OHMD). For example, unlike purely compositing using a video stream, the additive display is capable of reflecting projected images off of the display while enabling the user to see through the display. In some implementations, the see-through display includes a photochromic lens. The HMD adds computer-generated objects to the ambient light entering the see-through display in order to enable display of the operating environment 300. For example, a see-through display 312 permits ambient light from the operating environment 300 that includes the portion of the physical table 302 and the physical lamp 304, and thus the see-through display 312 displays respective representations of the portion of the physical table 302 and the physical lamp 304 (See FIG. 3B).

As illustrated in FIG. 3B, the electronic device 310 displays, on the display 312, a representation of the portion of the physical table 302 (hereinafter sometimes "the portion of the physical table 302" or the "physical table 302" for the sake of brevity) and a representation of the physical lamp 304 (hereinafter sometimes "the physical lamp 304" for the sake of brevity). Moreover, the finger-wearable device 320 moves to within the viewable region 314, and thus the display 312 displays a representation of the finger-wearable device 320 (hereinafter sometimes "the finger-wearable device 320" for the sake of brevity).

One of ordinary skill in the art will appreciate that, in various implementations, the finger-wearable device 320 is outside of the viewable region 314. Nevertheless, the electronic device 310 obtains the finger manipulation data from the finger-wearable device 320 via the communication interface. As a result, the electronic device 310 may perform mapping according to various implementations disclosed herein, regardless of whether or not the finger-wearable device 320 is viewable on the display 312 or by any of the image sensors 143.

As illustrated in FIG. 3C, the electronic device 310 displays, on the display 312, a computer-generated representation of a trackpad 324 (hereinafter sometimes "the trackpad 324" for the sake of brevity). In some implementations, the electronic device 310 displays the trackpad 324 in response to establishing the communication link with the finger-wearable device 320. In some implementations, the electronic device 310 displays one or more trackpad manipulation affordances 326a-326c. The trackpad manipulation affordance(s) 326a-326c are provided to manipulate the trackpad 324 and will be described below.

The trackpad 324 is spatially associated with a physical surface. For example, with reference to FIG. 3C, the electronic device 310 overlays the trackpad 324 on the surface of the physical table 302. To that end, in some implementations, the electronic device 310 identifies the physical surface (e.g., via instance segmentation or semantic segmentation with respect to image data) and overlays the trackpad 324 on a portion of the identified physical surface.

In some implementations, the trackpad 324 is a function of a dimensional criterion. For example, the electronic device 310 determines one or more dimensional characteristics (e.g., length, width, area) associated with the surface of the physical table 302 and generates the trackpad 324 in order to satisfy the dimensional criterion. As one example, with reference to FIG. 3C, the trackpad 324 is sized and positioned in order to fit on the surface of the physical table 302.

In some implementations, the trackpad 324 is a function of an occlusion criterion associated with a physical object. For example, with reference to FIG. 3C, the electronic device 310 identifies the physical lamp 304. Accordingly, the electronic device 310 positions the trackpad 324 on the display 312 so that the physical lamp 304 does not occlude the trackpad 324.

In some implementations, the trackpad 324 is a function of a location of the finger-wearable device 320 on the display 312. For example, in response to identifying the finger-wearable device 320 within the viewable region 314, the electronic device 310 displays the trackpad 324 at a position on the display 312 such that the finger-wearable device 320 hovers over a portion of the trackpad 324.

The physical surface (e.g., of the physical table 302) is viewable within the display 312 along with a content manipulation region 330 that is separate from the trackpad 324. For example, the content manipulation region 330 includes application content, such as web browser content, word processing content, drawing application content, etc. Based on the finger manipulation data from the finger-wearable device 320, the electronic device 310 determines a mapping between the trackpad 324 and the content manipulation region 330. Details regarding the mapping are provided below.

In some implementations, the electronic device 310 generates the content manipulation region 330. For example, the content manipulation region 330 corresponds to a virtual display screen, such as a virtual tablet.

In some implementations, the content manipulation region 330 is associated with a secondary device, such as a real-world laptop, real-world tablet, etc. For example, the electronic device 310 is communicatively coupled to the secondary device, and the secondary device includes a secondary display that displays the content manipulation region 330. The electronic device 310 may utilize computer-vision in order to identify the secondary display. As one example, the electronic device 310 transmits instructions to the secondary device. The instructions instruct the secondary device to modify, on the secondary display, content within the content manipulation region 330 based on the mapping.

The electronic device 310 identifies a first location within the trackpad 324 based on the finger manipulation data. For example, in response to establishing the communication link with the finger-wearable device 320, the electronic device 310 identifies the first location as approximately the center point of the trackpad 324.

As another example, as illustrated in FIG. 3D, when the finger-wearable device 320 hovers over a portion of the trackpad 324, the electronic device 310 maps a respective location of the finger-wearable device 320 to the first location within the trackpad 324 based on the finger manipulation data. The mapping is indicated by a hover line 332, which is illustrated for purely explanatory purposes. In some implementations, the electronic device 310 displays, on the display 312, a first indicator 334 indicating the first location. Displaying the first indicator 334 provides feedback to the user 50, thereby reducing erroneous (e.g., unintended) inputs from the finger-wearable device 320 and reducing resource utilization by the electronic device 310.

In some implementations, the appearance of the first indicator 334 is a function of a distance between the trackpad 324 and the finger-wearable device 320. For example, in some implementations, as the finger-wearable device 320 moves downward towards the trackpad 324, the electronic device 310 increases the size of the first indicator 334, based on finger manipulation data. As another example, in some implementations, based on positional data and contact intensity data indicating that the finger-wearable device 320 contacts a portion of the physical table 302 corresponding to the trackpad 324, the electronic device 310 changes the appearance of the first indicator 334. For example, in response to detecting that the finger-wearable device 320 contacts the portion of the physical table 302, the electronic device 310 changes an object type associated with the first indicator 334 (e.g., changes from a sphere to a cube) or changes an attribute of the first indicator 334 (e.g., makes brighter).

The electronic device 310 maps the first location within the trackpad 324 to a corresponding location within the content manipulation region 330. As illustrated in FIG. 3D, the trackpad 324 is associated with a first dimensional characteristic (e.g., a first display area) that is different from a second dimensional characteristic (e.g., a second display area) associated with the content manipulation region 330. In some implementations, despite differences in respective dimensional characteristics, the electronic device 310 maps between the trackpad 324 and the content manipulation region 330 according to a common aspect ratio. For example, the trackpad 324 corresponds to a 30 cm×30 cm square, and the content manipulation region 330 corresponds to a 160 cm×90 cm rectangle (190 cm width, 90 cm height). Continuing with the previous example, in response to detecting a 30 cm movement from the left edge of the trackpad 324 to the right edge of the trackpad 324, the electronic device 310 maps from the left edge of the content manipulation region 330 to the right edge of the content manipulation region 330. Accordingly, the electronic device 310 scales a 30 cm movement (associated with the trackpad 324) to a 160 cm movement (associated with the content manipulation region 330) in order to properly map movements associated with the trackpad 324 to the content manipulation region 330.

As illustrated in FIG. 3D, the first location (as indicated by 334) is near the upper edge of the trackpad 324, and approximately halfway in between the left edge of the trackpad 324 and a center vertical line of the trackpad 324. Accordingly, the electronic device 310 maps the first location to a corresponding location within the content manipulation region 330, and displays a second indicator 336 that is indicative of the mapping, as illustrated in FIG. 3E. The second indicator 336 overlaps the corresponding location within the content manipulation region 330. Displaying the second indicator 336 indicates, to the user 50, a mapping between a current location within the trackpad 324 and corresponding location within the content manipulation region 330. Accordingly, the second indicator 336 provides positional feedback information to the user 50, thereby reducing erroneous (e.g., unintended) inputs from the finger-wearable device 320 and reducing resource utilization by the electronic device 310. Moreover, in contrast to other devices that update a position of a displayed cursor based on detecting a positional change with respect to a physical trackpad, the electronic device 310, via the second indicator 336, indicates the current position associated with the trackpad 324 as mapped to the content manipulation region 330, independent of detecting a positional change with respect to the trackpad 324.

As illustrated in FIGS. 3F and 3G, based on finger manipulation data indicative of a movement of the finger-wearable device 320 across the trackpad 324, the electronic device 310 updates the mapping. As illustrated in FIG. 3F, the finger-wearable device 320 moves downwards across the surface of the physical table 302, as indicated by movement line 338 (illustrated for purely explanatory purposes). Accordingly, based on finger manipulation data (e.g., 3D positional data and contact intensity data) obtained as the finger-wearable device 320 moves across the physical table 302, the electronic device 310 determines that the finger-wearable device 320 moves downwards across the trackpad 324. Based on the movement of the finger-wearable device 320, the hover position with respect to the trackpad 324 accordingly changes. Thus, as indicated by an updated hover line 339 in FIG. 3G (illustrated for purely explanatory purposes), the electronic device 310 determines a second position within the trackpad 324 and moves the first indicator 334 to the second position. Moreover, the electronic device 310 maps the second location to an updated location within the content manipulation region 330. Thus, the electronic device 310 determines an updated location based on the second location, and correspondingly moves the second indicator 336 downwards, as illustrated in FIG. 3G.

In some implementations, rather than hover over the trackpad 324, a finger, which is wearing the finger-wearable device 320, moves across the surface of the physical table 302. While the finger moves across the physical table 302, the electronic device obtains positional data and contact intensity data from the finger-wearable device 320. For example, based on positional data and interferometer data from the finger-wearable device 320, the electronic device 320 detects deformation of the finger as the finger moves across the surface of the physical table 302, and determines that the finger is moving across the physical table 302 based in part on the deformation. Accordingly, the electronic device 310 determines an updated location on the trackpad 324 based on data indicative of the movement of the finger, and maps to a respective location within the content manipulation region 330.

FIGS. 3H-3L illustrate various examples of manipulating the trackpad 324. As illustrated in FIG. 3H, the electronic device 310 displays, on the display 312, a first trackpad manipulation affordance 326a, a second trackpad manipulation affordance 326b, and a third trackpad manipulation affordance 326c. One of ordinary skill in the art will appreciate that, in some implementations, the number of trackpad manipulation affordances and respective corresponding trackpad manipulation operations may differ.

The electronic device 310 receives a first selection input 340 that selects the first trackpad manipulation affordance 326a, as illustrated in FIG. 3H. The first trackpad manipulation affordance 326a is associated with a trackpad move operation. In some implementations, the first selection input 340 is directed to a spatial location on the display 312 that corresponds to a spatial location of the first trackpad manipulation affordance 326a on the display 312. In some implementations, a particular selection input corresponds to one of an extremity tracking input, eye tracking input, stylus touch input, finger manipulation input via the finger-wearable device 320, and/or the like. In response to receiving the first selection input 340 in FIG. 3H, the electronic device 310 selects the first trackpad manipulation affordance 326a and the corresponding trackpad move operation, as illustrated by a gray overlay displayed within the first trackpad manipulation affordance 326a in FIG. 3I.

As illustrated in FIG. 3I, the electronic device 310 receives a first manipulation input 342 that is associated with the trackpad 324. The first manipulation input 342 corresponds to a leftward drag of the trackpad 324. In some implementations, a particular manipulation input corresponds to one of an extremity tracking input, eye tracking input, stylus touch input, finger manipulation input via the finger-wearable device 320, and/or the like.

In response to receiving the first manipulation input 342 in FIG. 3I, the electronic device 310 manipulates the trackpad 324 according to the trackpad move operation that is associated with the selected first trackpad manipulation affordance 326a. Namely, as illustrated in FIGS. 3I and 3J, the electronic device 310 moves the trackpad 324 leftwards across the physical table 302 based on a magnitude of the first manipulation input 342. Moreover, the electronic device 310 moves the one or more trackpad manipulation affordances 326a-326c leftwards in order to maintain the position of the one or more trackpad manipulation affordances 326a-326c relative to the trackpad 324.

As illustrated in FIG. 3J, the electronic device 310 receives a second selection input 344 that selects the second trackpad manipulation affordance 326b. The second trackpad manipulation affordance 326b is associated with a trackpad resize operation. In response to receiving the second selection input 344 in FIG. 3J, the electronic device 310 selects the second trackpad manipulation affordance 326b and the corresponding trackpad resize operation, as illustrated by a gray overlay displayed within the second trackpad manipulation affordance 326b in FIG. 3K.

As illustrated in FIG. 3K, the electronic device 310 receives a second manipulation input 346 that is associated with the trackpad 324. The second manipulation input 346 corresponds to an expansion of the trackpad 324 towards the bottom edge of the display 312. In response to receiving the second manipulation input 346 in FIG. 3K, the electronic device 310 manipulates the trackpad 324 according to the trackpad resize operation that is associated with the selected second trackpad manipulation affordance 326b. Namely, as illustrated in FIGS. 3K and 3L, the electronic device 310 resizes (e.g., expands) the trackpad 324 downwards and rightwards towards the bottom edge of the display 312 based on a magnitude of the second manipulation input 346. Moreover, the electronic device 310 moves the one or more trackpad manipulation affordances 326a-326c downwards and rightwards in order to maintain the position of the one or more trackpad manipulation affordances 326a-326c relative to the trackpad 324. According to various implementations, based on an input from the user 50, the electronic device 310 resizes the trackpad 324 or changes an aspect ratio associated with the trackpad 324, while maintaining a common aspect ratio between the trackpad 324 and the content manipulation region 330.

FIGS. 3M-3Q illustrate an example of manipulating content displayed within the content manipulation region 330 based on a corresponding mapping. As illustrated in FIG. 3M, the content manipulation region 330 includes content including a tree 350. Moreover, the content manipulation region 330 includes one or more affordances 351 that are provided to enable a corresponding content manipulation operation with respect to a portion of the content. As illustrated in FIG. 3M, the one or more affordances 351 correspond to one or more drawing tools, with the pencil drawing tool being currently selected. One of ordinary skill in the art will appreciate that, in some implementations, the number and types of affordances may differ.

As illustrated in FIG. 3N, the finger-wearable device 320 moves within the viewable region 314 and thus the display 312 displays the finger-wearable device 320. Moreover, as is indicated by tap indicator 352 (illustrated for purely explanatory purposes), the finger-wearable device 320 begins to perform a tap gesture onto the trackpad 324. As the finger-wearable device 320 performs the tap gesture, the electronic device 310 receives finger manipulation data from the finger-wearable device 320. For example, the electronic device 310 receives 3D rotational data from an IMU sensor integrated in the finger-wearable device 320 and 3D positional data from a magnetic sensor integrated in the finger-wearable device 320. As another example, the electronic device 310 also receives contact intensity data from a contact intensity sensor integrated in the finger-wearable device 320. The electronic device 310 maps a respective location of the finger-wearable device 320 to a third location within the trackpad 324 based on the finger manipulation data. In some implementations, the electronic device 310 displays, on the display 312, a third indicator corresponding to the third location. The electronic device 310 maps the third location within the trackpad 324 to a corresponding location within the content manipulation region 330.

As illustrated in FIG. 3O, the finger-wearable device 320 finishes performing the tap gesture. Based on the finger manipulation data, the electronic device 310 determines that the finger-wearable device 320 performs the tap gesture. For example, the electronic device 310 determines that the finger-wearable device 320 performs the tap gesture based on positional data that indicates that the movement of the finger-wearable device 320 is downwards and terminates within the trackpad 324. As another example, based on the contact intensity data, the electronic device 310 detects a threshold amount of pressure that results from a finger, which is wearing the finger-wearable device 320, tapping on the physical table 302. The electronic device 310 displays a fourth indicator 354 indicative of the mapping. The fourth indicator 354 provides useful feedback to the user 50, such as a location on the tree 350 on which a drawing mark will be displayed, as will be described below.

As illustrated in FIGS. 3P and 3Q, the finger-wearable device 320 moves across the trackpad 324, as is indicated by movement line 356 (illustrated for purely explanatory purposes). Accordingly, as illustrated in FIG. 3Q, the electronic device 320 updates the location of the fourth indicator 354 within the content manipulation region 330 according to the magnitude of the movement of the finger-wearable device 320. Moreover, the electronic device 320 displays, within the content manipulation region 330, a pencil mark 358 according to the magnitude of the movement of the finger-wearable device 320, because the pencil drawing tool is currently selected.

In some implementations, in response to receiving an input directed to a particular one of the one or more affordances 351, the electronic device 310 changes the currently selected affordance to the particular one of the one or more affordances 351. In some implementations, the input may be one of an extremity tracking input, eye tracking input, stylus input, input from the finger-wearable device 320, etc. For example, the finger-wearable device 320 moves to a location on the display 312 that corresponds to a pen drawing tool affordance. Accordingly, the electronic device 310 changes selection from the pencil drawing operation to a pen drawing operation that is associated with the pen drawing tool affordance. Thus, a subsequent finger manipulation input directed to within the trackpad 324 results in the electronic device 310 displaying a pen (not pencil) mark at a mapped location within the content manipulation region 330.

FIGS. 3R-3W illustrate an example of manipulating the content manipulation region 330 based on determining that a mapping satisfied a proximity threshold with respect to an affordance 359. Although the finger-wearable device 320 is outside of the field-of-view corresponding to the viewable region 314 (and thus not displayed on the display 312) in FIGS. 3R-3W, one of ordinary skill in the art will appreciate that, in some implementations, the mapping occurs while the finger-wearable device 320 is within the field-of-view corresponding to the viewable region 314.

As illustrated in FIG. 3R, the electronic device 310 displays the affordance 359 on the display 312. The affordance 359 is associated with a manipulation operation with respect to the content manipulation region 330. For example, in response to determining selection of the affordance 359, the electronic device 310 changes the appearance of (e.g., resizing or repositing) the content manipulation region 330, duplicates the content manipulation region 330, invokes application content that is displayed within the content manipulation region 330, and/or the like. The affordance 359 may be positioned outside of the content manipulation region 330. As will be described below, the electronic device 310 displays various indicators to the user 50 in order to assist the user 50 in selecting the affordance 359.

As further illustrated in FIG. 3R, although the finger-wearable device 320 is outside of the field-of-view corresponding to the viewable region 314, the electronic device identifies a respective location associated with the finger-wearable device 320 based on finger manipulation data. Namely, the electronic device 310 displays a fifth indicator 360 that is indicative of the respective location, as illustrated in FIG. 3R.

Moreover, the respective location associated with the finger-wearable device 320 is spatially associated with the trackpad 324. Namely, the respective location hovers over the trackpad 324, as is indicated by hover indicator 362 (illustrated for purely explanatory purposes). Accordingly, the electronic device 310 maps the respective location to a corresponding location within the content manipulation region 330, and displays a sixth indicator 364 within the content manipulation region 330 that is indicative of the mapping.

As illustrated in FIGS. 3S, the finger-wearable device 320 moves leftwards, as is indicated by movement line 366. The electronic device 310 obtains finger manipulation data as the finger-wearable device 320 moves leftwards. Based on the finger manipulation data, the electronic device 310 updates the respective location associated with the finger-wearable device 320. Notably, as indicated by an updated hover indicator 362 illustrated in FIG. 3T, the updated respective location is not associated with the trackpad 324 (e.g., no longer hovering over the trackpad 324). Nevertheless, as illustrated in FIG. 3T, the electronic device 310 continues to display fifth indicator 360 at a position corresponding to the updated respective location, in order to provide useful feedback to the user 50. Moreover, in some implementations, the electronic device 310 continues to display the sixth indicator 364, based on the updated respective location relative to the trackpad 324. Namely, the electronic device 310 moves the sixth indicator 364 leftwards to a position that is outside of the content manipulation region 330. Continuing to display the sixth indicator 364 provides feedback to the user 50 regarding the mapping, and thus aids the user 50 in selecting the affordance 359.

As illustrated in FIG. 3U, the finger-wearable device 320 moves further leftwards, as is indicated by movement line 368. The electronic device 310 obtains finger manipulation data as the finger-wearable device 320 moves further leftwards. Based on the finger manipulation data, the electronic device 310 updates the respective location associated with the finger-wearable device 320, and accordingly repositions the fifth indicator 360 further leftwards, as illustrated in FIGS. 3U and 3V. Moreover, the electronic device 310 maps the updated position of the fifth indicator 360 to an updated position of the sixth indicator 364. Accordingly, as illustrated in FIGS. 3U and 3V, the electronic device 310 moves the sixth indicator 364 further leftwards to the updated position. The updated position of the sixth indicator 364 satisfies a proximity threshold with respect to the affordance 359. For example, the updated position of the sixth indicator 364 satisfies the proximity threshold when the updated position is less than a threshold distance from or within the affordance 359.

Based on the updated position of the sixth indicator 364 satisfying the proximity threshold, the electronic device 310 selects the affordance 359. In response to selection of the affordance 359, the electronic device 310 resizes the content manipulation region 330 in order to include the affordance 359, as illustrated in FIG. 3W. One of ordinary skill in the art will appreciate that selection of the affordance 359 may result in a different manipulation operation with respect to the content manipulation region 330, as described above.

Although the examples described with reference to FIGS. 3A-3W are directed to mapping based on finger manipulation data from the finger-wearable device 320, various implementations include performing a similar mapping based on extremity identification data from an integrated computer vision system. For example, in some implementations, the electronic device 310 obtains image data, and performs a computer vision technique (e.g., semantic segmentation) with respect to the image data in order to identify an extremity of the user 50. Accordingly, by using the computer vision technique, the electronic device 310 determines a location of the extremity within the trackpad 324, and accordingly maps the location to a corresponding location within the content manipulation region 330.

Figure 4:
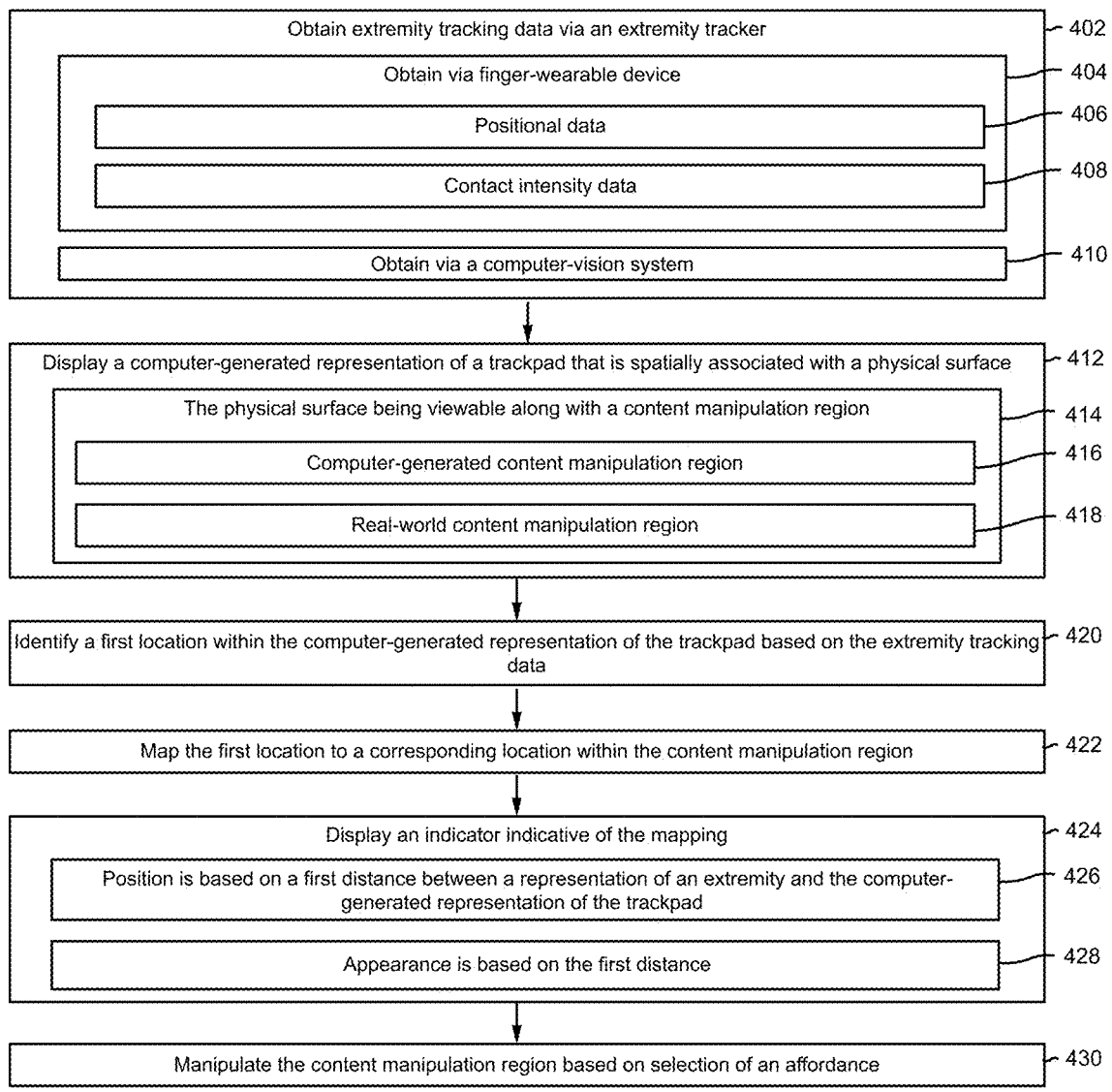
FIG. 4 is an example of a flow diagram of a method of mapping a computer-generated trackpad to a content manipulation region in accordance with some implementations.

FIG. 4 is an example of a flow diagram of a method 400 of mapping a computer-generated trackpad to a content manipulation region in accordance with some implementations. In various implementations, the method 400 or portions thereof are performed by an electronic device (e.g., the electronic device 100 in FIG. 1 or the electronic device 310 in FIGS. 3A-3W). In various implementations, the method 400 or portions thereof are performed by a head-mountable device (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes obtaining extremity tracking data via an extremity tracker. For example, in some implementations, the extremity tracker includes a communication interface provided to communicate with a finger-wearable device. As another example, in some implementations, the extremity tracker includes a computer-vision system.

As represented by block 404, in some implementations, the method 400 includes obtaining finger manipulation data from the finger-wearable device via the communication interface, wherein the finger manipulation data is included in the extremity tracking data. For example, as described with reference to FIGS. 3A-3W, the electronic device 310 obtains various types of finger manipulation data from the finger-wearable device 320. The finger manipulation data may indicate positional (e.g., 6 degrees of freedom) and contact intensity (e.g., force or pressure) information associated with the finger-wearable device. In some implementations, the finger manipulation data is indicative of a gesture performed by the finger-wearable device. According to various implementations, the finger manipulation data corresponds to sensor data associated with one or more sensors integrated within the finger-wearable device. For example, as represented by block 406, the sensor data includes positional data output from one or more positional sensors integrated in the finger-wearable device. As one example, the positional data is indicative of a rotational movement (e.g., IMU data) and/or a translational movement (e.g., magnetic sensor data) of the finger-wearable device, such as is illustrated in FIGS. 3F, 3G, 3P, and 3Q. In some implementations, the magnetic sensor data is output by a magnetic sensor that is integrated within the finger-wearable device, wherein the magnetic sensor senses weak magnetic fields. As another example, as represented by block 408, the sensor data includes contact intensity data output from a contact intensity sensor integrated in the finger-wearable device, such as in connection with the tap gesture on the physical table 302 illustrated in FIGS. 3N and 3O. As one example, the contact intensity data includes interferometer data that is indicative of tap pressure associated with a gesture that is performed by the finger-wearable device. The interferometer data may be from an interferometer that is integrated within the finger-wearable device. For example, the interferometer data indicates a pressure level associated with a finger, wearing the finger-wearable device, contacting a physical object. As one example, the finger-wearable device senses (e.g., via the contact intensity sensor) deflection of a pad of a finger when the finger contacts the physical surface. Accordingly, various implementations disclosed herein enable a user to feel a physical surface (and the texture of the physical surface) with which the user is interacting. As yet another example, in some implementations, the sensor data includes a combination of the positional data and the contact intensity data.

As represented by block 410, in some implementations, the method 400 includes obtaining extremity identification data from the computer-vision system, wherein the extremity identification data is included in the extremity tracking data. For example, the computer-vision system performs a computer-vision technique (e.g., object identification) in order to identify an extremity with respect to image data.

As represented by block 412, the method 400 includes displaying, on a display, a computer-generated representation of a trackpad that is spatially associated with a physical surface. As represented by block 410, the physical surface is viewable within the display along with a content manipulation region that is separate from the computer-generated representation of the trackpad. For example, with reference to FIG. 3C, the electronic device 310 displays, on the display 312, the trackpad 324, which is spatially associated with (e.g., overlaid onto) the physical table 302. Moreover, as illustrated in FIG. 3C, the content manipulation region 330 is viewable within the display 312 and is separate from the trackpad 324. In some implementations, the content manipulation region 330 and the trackpad 324 and substantially orthogonal to each other. For example, with reference to FIG. 3C, the trackpad 324 is overlaid onto a horizontal surface of the physical table 302, wherein the content manipulation region 330 is vertically oriented. As another example, the content manipulation region includes application content, such as web browser content, word processing content, drawing application content, etc. For example, in some implementations, the application content is displayed within the content manipulation region 330, or within both the content manipulation region and the trackpad. Displaying the trackpad overlaid on the physical surface provides useful feedback to a user, such as haptic feedback resulting from a user's finger (wearing the finger-wearable device) contacting the physical surface. In some implementations, the method 400 includes sizing the trackpad in order to fit on the physical surface, thereby avoiding the situation in which the trackpad is excessively large or excessively far away (e.g., relatively high depth value) from a user to be efficiently manipulated.

In some implementations, as represented by block 416, the content manipulation region corresponds to a computer-generated content manipulation region, such as a display screen of a virtual tablet. To that end, in some implementations, while displaying the computer-generated representation of the trackpad, the method 400 includes displaying the computer-generated content manipulation region.

In some implementations, as represented by block 418, the content manipulation region corresponds to a real-world content manipulation region, such as a display screen of a secondary (e.g., auxiliary) device. To that end, in some implementations, an electronic device performing the method 400 is communicatively coupled to the secondary device (e.g., a tablet, laptop, smartphone), and the secondary device includes a secondary display that displays the content manipulation region.

As represented by block 420, while displaying the computer-generated representation of the trackpad, the method 400 includes identifying a first location within the computer-generated representation of the trackpad based on the extremity tracking data. For example, with reference to FIG. 3D, the electronic device 310 determines a first location within the trackpad 324 (indicated by the first indicator 334) based on the positional data (e.g., a combination of 3D positional data and 3D rotational data) from the finger-wearable device 320. As another example, with reference to FIGS. 3N and 3O, in addition to utilizing the positional data, the electronic device 310 utilizes contact intensity data from the finger-wearable device 320 in order to detect when the finger-wearable device 320 performs the tap gesture. Continuing with this example, the contact intensity data is indicative of a pressure level associated with a finger, wearing the finger-wearable device 320, contacting the physical table 302. In some implementations, an electronic device determines, based on the finger manipulation data, that the finger-wearable device satisfies a proximity threshold with respect to the computer-generated representation of the trackpad. For example, the finger-wearable device contacts or hovers over the computer-generated representation of the trackpad, as are respectively illustrated in FIGS. 3N-3O and FIG. 3D. As another example, in some implementation, based on extremity identification data from a computer-vision system, an electronic device identifying a first location within the computer-generated representation of the trackpad.

As represented by block 422, while displaying the computer-generated representation of the trackpad, the method 400 includes mapping the first location to a corresponding location within the content manipulation region. For example, with reference to FIG. 3E, the electronic device 310 maps the first location within the trackpad 324 (indicated by the first indicator 334) to a corresponding location within the content manipulation region 330 (as indicated by the second indicator 336). Namely, because the first location is positioned near the upper edge of the trackpad 324, the electronic device 310 determines that the corresponding location is likewise positioned near the upper edge of the content manipulation region 330.

As represented by block 424, while displaying the computer-generated representation of the trackpad, the method 400 includes displaying an indicator indicative of the mapping. The indicator may overlap the corresponding location within the content manipulation region. For example, with reference to FIG. 3E, the electronic device 310 displays, on the display 312, the second indicator 336 that is indicative of the mapping. In some implementations, method 400 includes displaying the indicator when the mapped location is within the content manipulation region, and ceasing to display the indicator when the mapped location moves outside of the content manipulation region. In some implementations, the method 400 includes displaying the indicator when a mapped location is outside of the content manipulation region but less than a threshold distance from an affordance. For example, with reference to FIG. 3T, the electronic device 310 maintains display of the sixth indicator 364 because a corresponding mapped location, which is outside of the content manipulation region 330, is less than a threshold distance from the affordance 359. One of ordinary skill in the art will appreciate that the indicator may correspond to any type of content.

As represented by block 426, in some implementations, the position of the indicator is based on a first distance between a representation of an extremity and the computer-generated representation of the trackpad. To that end, in some implementations, the method 400 includes determining a position of the representation of the extremity within an environment (e.g., an XR environment). In some implementations, an electronic device includes a computer-vision system that determines the position of the representation of the extremity, as represented within image data obtained from a camera. In some implementations, an electronic device determines the position of the representation of the extremity based on finger manipulation data. As one example, with reference to FIG. 3R, based on finger manipulation data the electronic device 310 determines a respective position associated with the finger-wearable device 320, as indicated by the fifth indicator 360. In the previous example, the fifth indicator 360 corresponds to the representation of the extremity.

According to various implementations, the method 400 includes positioning the indicator relative to the content manipulation region, based on the first distance.

In some implementations, the method 400 includes displaying the indicator at a second distance from the content manipulation region, wherein the second distance is based on a function of the first distance. The second distance may be proportional to the first distance. For example, as the representation of the extremity moves closer to the computer-generated representation of the trackpad, the indicator moves correspondingly closer to the content manipulation region (e.g., a lower z-value with respect to the content manipulation region). As a counterexample, as the representation of the extremity moves away from the computer-generated representation of the trackpad, the indicator moves correspondingly away from the content manipulation region (e.g., a higher z-value with respect to the content manipulation region).

As another example, in some implementations, based on the first distance being a nominal value (e.g., user's finger taps the table 302, as illustrated in FIG. 3Q), the method 400 includes positioning the indicator less than a threshold distance from the content manipulation region. The indicator may be positioned at a nominal distance from the content manipulation region. Continuing with this example, in some implementations, the method 400 includes maintaining the position of the indicator until the representation of the extremity moves more than a threshold distance away from the computer-generated representation of the trackpad. Accordingly, in some implementations, the indicator appears to be stuck to the content manipulation region, to a certain degree.

As represented by block 428, in some implementations, the appearance of the indicator is based on the first distance between the representation of the extremity and the computer-generated representation of the trackpad. For example, in some implementations, based on the first distance being a nominal value (e.g., user's finger taps the table 302, as illustrated in FIG. 3Q), the method 400 includes setting the size of the indicator to a predetermined (e.g., nominal) size. In some implementations, the method 400 includes resizing the indicator based on a function of the first distance. For example, the method 400 includes increasing the size of the indicator as the first distance increases, and vice versa. Resizing the indicator may be based on a linear or piecewise function of the first distance. As another example, the method 400 includes changing a different characteristic associated with the indicator based on a function of the first distance, such as changing a color, shape, opacity, etc. associated with the indicator.

In some implementations, the method 400 includes concurrently modifying the position of the indicator and the appearance of the indicator based on the first distance. For example, as the first distance increases, an electronic device decreases a z-depth associated with the indicator (e.g., so as to appear to be moving away from the content manipulation region and towards the user) while increasing the size of the indicator.

As represented by block 430, in some implementations, the method 400 includes manipulating the content manipulation region based on selection of an affordance. For example, with reference to FIGS. 3R-3W, the electronic device 310 maps the respective location associated with the finger-wearable device 320 to a corresponding location associated with the content manipulation region 330, based on finger manipulation data. The electronic device 310 determines whether the corresponding location associated with the content manipulation region 330 satisfies a proximity threshold with respect to the affordance 359. In response to determining satisfaction of the proximity threshold, the electronic device 310 selects the affordance 359, and manipulates (e.g., resizes) the content manipulation region 330 according to a manipulation operation associated with the affordance 359.

In some implementations, in response to detecting, based on finger manipulation data, that the finger-wearable device moves outside of the trackpad, the method 400 includes displaying an affordance (e.g., a selectable button) at a corresponding location outside of the content manipulation region. For example, in response to detecting that the finger-wearable device moves to outside of the upper-right corner of the trackpad, an electronic device displays an affordance outside the upper-right corner of the content manipulation region. In some implementations, in response to detecting an input that selects (e.g., is spatially directed to) the affordance, the method 400 includes expanding the content manipulation region in order to include the position associated with the affordance. In some implementations, the method 400 includes displaying a focus selector (e.g., a cursor), based on a distance between an extremity of a user (e.g., tracked via finger manipulation data or extremity identification data) and the affordance. The focus selector is indicative of a location of the extremity. For example, the method 400 includes maintaining display of the focus selector when the extremity is less than or equal to a threshold distance from the affordance, and ceasing to display the focus selector when the extremity is farther than the threshold distance.

Figure 5:
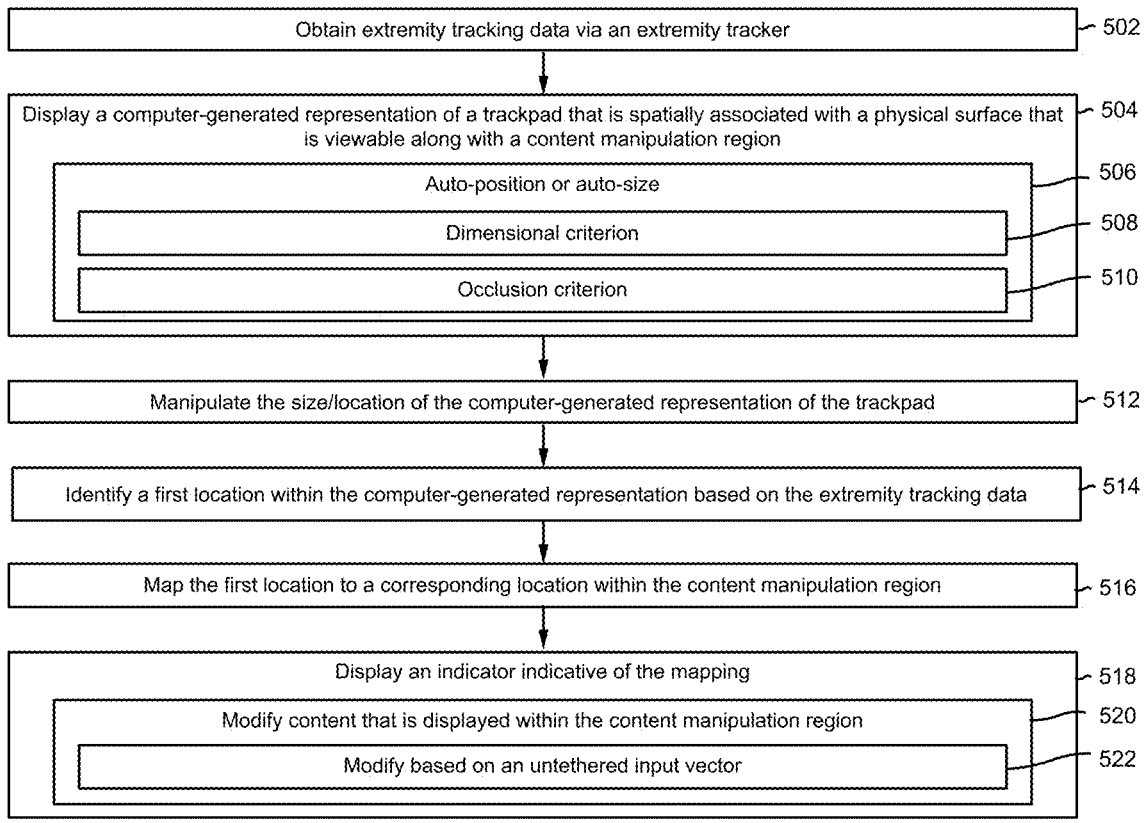
FIG. 5 is another example of a flow diagram of a method of mapping a computer-generated trackpad to a content manipulation region in accordance with some implementations.

FIG. 5 is another example of a flow diagram of a method 500 of mapping a computer-generated trackpad to a content manipulation region in accordance with some implementations. In various implementations, the method 500 or portions thereof are performed by an electronic device (e.g., the electronic device 100 in FIG. 1 or the electronic device 310 in FIGS. 3A-3W). In various implementations, the method 500 or portions thereof are performed by a head-mountable device (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes obtaining extremity tracking data via an extremity tracker.

As represented by block 504, the method 500 includes displaying, on a display, a computer-generated representation of a trackpad that is spatially associated with a physical surface. The physical surface is viewable within the display along with a content manipulation region that is separate from the computer-generated representation of the trackpad. In some implementations, the content manipulation region includes an affordance that is provided to enable a corresponding content manipulation operation with respect to a portion of the content manipulation region. For example, with reference to FIG. 3M, the content manipulation region 330 includes one or more affordances 351 respectively associated with one or more drawing tools. As one example, an input directed to a particular affordance results in activating a corresponding operation. For example, an input directed to a pencil tool affordance selects a pencil drawing operation as the currently active drawing operation.

As represented by block 506, in some implementations, the method 500 includes auto-positioning or auto-sizing the computer-generated representation of the trackpad. To that end, in some implementations, the method 500 includes identifying the physical surface and overlaying the computer-generated representation of the trackpad on the physical surface. For example, with reference to FIG. 3C, the electronic device 310 identifies the surface of the physical table 302, and overlays the trackpad 324 on the surface. In some implementations, identifying the physical surface includes performing various computer vision techniques (e.g., instance segmentation or semantic segmentation), optionally with the aid of a neural network.

In some implementations, as represented by block 508, the method 500 includes determining one or more dimensional characteristics associated with the physical surface, wherein the computer-generated representation of the trackpad satisfies a dimensional criterion with respect to the one or more dimensional characteristics. Referring back to FIG. 3C, the electronic device 310 sizes and positions the trackpad 324 in order to fit on the surface of the physical table 302. In some implementations, the method 500 utilizes respective dimensional characteristics associated with the trackpad and with the content manipulation region in order to map between the trackpad and the content manipulation region according to a common aspect ratio, as is described above.

In some implementations, as represented by block 510, the computer-generated representation of the trackpad satisfies an occlusion criterion with respect to a physical object. For example, with reference to FIG. 3C, the electronic device 310 positions/sizes the trackpad 324 so that the physical lamp 304 does not occlude the trackpad 324. As another example, the electronic device 310 positions/sizes the trackpad 324 so that a hand of the user 50 does not occlude a substantial portion of the trackpad 324.

According to various implementations, as represented by block 512, the method 500 includes manipulating the computer-generated representation of the trackpad based on one or more user inputs. To that end, while displaying the computer-generated representation of the trackpad, the method 500 includes displaying a trackpad manipulation affordance that is associated with a trackpad manipulation operation. For example, with reference to FIG. 3C, the electronic device 310 displays, on the display 312, one or more trackpad manipulation affordances 326a-326c. Moreover, the method 500 includes receiving a selection input selecting the trackpad manipulation affordance. For example, with reference to FIG. 3H, the electronic device receives the first selection input 340 that selects the first trackpad manipulation affordance 326a that is associated with a trackpad move operation. As another example, with reference to FIG. 3J, the electronic device receives the second selection input 344 that selects the second trackpad manipulation affordance 326b that is associated with a trackpad resize operation. Moreover, the method 500 includes, after receiving the selection input, receiving a manipulation input that is associated with the computer-generated representation of the trackpad and manipulating the computer-generated representation of the trackpad according to the manipulation input and the trackpad manipulation operation. For example, while the trackpad move operation is selected, the electronic device 310 receives a first manipulation input 342 in FIG. 3I, and the electronic device 310 accordingly moves the trackpad 324, as illustrated in FIG. 3J. As another example, while the trackpad resize operation is selected, the electronic device 310 receives a second manipulation input 346 in FIG. 3K, and the electronic device 310 accordingly resizes the trackpad 324, as illustrated in FIG. 3L.

As represented by block 514, while displaying the computer-generated representation of the trackpad, the method 500 includes identifying a first location within the computer-generated representation of the trackpad based on the finger manipulation data.

As represented by block 516, while displaying the computer-generated representation of the trackpad, the method 500 includes mapping the first location to a corresponding location within the content manipulation region. For example, in some implementations, the method 500 includes determining, based on finger manipulation data, that a finger-wearable device corresponds to a respective spatial location hovering over the computer-generated representation of the trackpad. Continuing with the previous example, mapping the first location within the computer-generated representation of the trackpad to the corresponding location within the content manipulation region includes mapping the respective spatial location to the first location, and mapping the first location to the corresponding location within the content manipulation region. In some implementations, mapping is based on a function of extremity identification data from a computer-vision system.

As represented by block 518, while displaying the computer-generated representation of the trackpad, the method 500 includes displaying an indicator indicative of the mapping. For example, in some implementations, displaying the indicator includes modifying content that is displayed within the content manipulation region based on a function of the mapping. Modifying content may include one or more of annotating, editing content, etc. As one example, with reference to FIGS. 3P and 3Q, in response to receiving finger manipulation data indicative of the finger-wearable device 320 moving across the trackpad 324, the electronic device 310 displays the pencil mark 358 within the content manipulation region 330. Continuing with the previous example, the pencil mark 358 may be generated by the electronic device 310 or may be generated (based on instructions from the electronic device 310) by a secondary device with a secondary display that display the content manipulation region 330. For example, the electronic device 310 transmits instructions to a real-world tablet displaying the content manipulation region 330, and the real-world tablet accordingly displays the pencil mark 358. In some implementations, as represented by block 522, modifying the content is further based on a function of an untethered input vector. The untethered input vector may be indicative of a combination of eye tracking indicator values (e.g., eye position, eye speed), extremity tracking indicator values (e.g., extremity position, extremity steadiness), etc. To that end, an electronic device includes an untethered input system that receives the untethered input vector. The untethered input system may include one or more of an eye tracking system, extremity tracking system, stylus input system, voice detection system, etc.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    at an electronic device with one or more processors, a non-transitory memory, a display, and an extremity tracker:
        obtaining, via the extremity tracker, extremity tracking data;
        displaying, on the display, a computer-generated representation of a trackpad that is overlaid on a physical surface, the physical surface being viewable within the display along with a content manipulation region that is viewable within the display and is separate from the computer-generated representation of the trackpad; and
        while displaying, on the display, the computer-generated representation of the trackpad:
            identifying a first location within the computer-generated representation of the trackpad based on the extremity tracking data, the extremity tracking data comprising a hover distance between an extremity of a user and the computer-generated representation of the trackpad;
            mapping the first location to a corresponding location within the content manipulation region; and
            displaying, on the display, an indicator indicative of the mapping.

2. The method of claim 1, wherein the extremity tracker includes a communication interface provided to communicate with a finger-wearable device, wherein the extremity tracking data includes finger manipulation data from the finger-wearable device via the communication interface, and wherein identifying the first location is based on at least the finger manipulation data.

3. The method of claim 2, wherein the finger manipulation data corresponds to sensor data associated with one or more sensors integrated within the finger-wearable device that includes at least one of positional data output from one or more positional sensors integrated in the finger-wearable device or contact intensity data output from a contact intensity sensor integrated in the finger-wearable device.

4. The method of claim 2, wherein the finger manipulation data is indicative of a gesture performed via the finger-wearable device.

5. The method of claim 1, wherein the extremity tracker includes a computer-vision system that outputs extremity identification data, wherein the extremity identification data is included in the extremity tracking data, and wherein identifying the first location is based on at least the extremity identification data.

6. The method of claim 1, wherein the content manipulation region corresponds to a computer-generated content manipulation region, the method further comprising:

while displaying the computer-generated representation of the trackpad, displaying, on the display, the computer-generated content manipulation region.

7. The method of claim 1, wherein the electronic device is communicatively coupled to a secondary device, and wherein the secondary device includes a secondary display that displays the content manipulation region.

8. The method of claim 1, wherein the content manipulation region includes an affordance that is provided to enable a corresponding content manipulation operation with respect to a portion of the content manipulation region.

9. The method of claim 1, further comprising determining one or more dimensional characteristics associated with the physical surface, wherein the computer-generated representation of the trackpad satisfies a dimensional criterion with respect to the one or more dimensional characteristics.

10. The method of claim 1, wherein the computer-generated representation of the trackpad satisfies an occlusion criterion with respect to a physical object.

11. The method of claim 1, further comprising:
while displaying the computer-generated representation of the trackpad, displaying, on the display, a trackpad manipulation affordance that is associated with a trackpad manipulation operation;
receiving a selection input selecting the trackpad manipulation affordance;
after receiving the selection input, receiving a manipulation input that is associated with the computer-generated representation of the trackpad; and
manipulating the computer-generated representation of the trackpad according to the manipulation input and the trackpad manipulation operation.

12. The method of claim 1, further comprising:
determining, based on the extremity tracking data, that a respective extremity corresponds to a respective spatial location hovering over the computer-generated representation of the trackpad;
wherein mapping the first location within the computer-generated representation of the trackpad to the corresponding location within the content manipulation region includes:
mapping the respective spatial location to the first location, and
mapping the first location to the corresponding location within the content manipulation region.

13. The method of claim 1, further comprising displaying the content within the computer-generated representation of the trackpad.

14. The method of claim 1, further comprising:
in response to determining, based on the extremity tracking data, that a corresponding extremity moves from the first location to a second location; and
in accordance with a determination that the second location is outside of the computer-generated representation of the trackpad:
mapping the second location to a second corresponding location outside of the content manipulation region; and
displaying an affordance at the second corresponding location outside of the content manipulation region.

15. The method of claim 14, in response to receiving an input selecting the affordance, enlarging the content manipulation region in order to include the second corresponding location.

16. The method of claim 1, further comprising:
identifying a second location that is outside of the computer-generated representation of the trackpad based on the extremity tracking data;
mapping the second location to a second corresponding location that is outside of the content manipulation region; and
moving the indicator in order to overlap the second corresponding location.

17. The method of claim 16, further comprising:
displaying, on the display, an affordance that is outside of the content manipulation region, wherein the affordance is associated with a manipulation operation; and
in response to determining that the second corresponding location satisfies a proximity threshold with respect to the affordance, manipulating the content manipulation region according to the manipulation operation.

18. An electronic device comprising:
one or more processors;
a non-transitory memory;
a display;
an extremity tracker; and
one or more programs, wherein the one or more programs are stored in the non-transitory memory and configured to be executed by the one or more processors, the one or more programs including instructions for:
obtaining, via the extremity tracker, extremity tracking data;
displaying, on the display, a computer-generated representation of a trackpad that is overlaid on a physical surface, the physical surface being viewable within the display along with a content manipulation region that is viewable within the display and is separate from the computer-generated representation of the trackpad; and
while displaying, on the display, the computer-generated representation of the trackpad:
identifying a first location within the computer-generated representation of the trackpad based on the extremity tracking data, the extremity tracking data comprising a hover distance between an extremity of a user and the computer-generated representation of the trackpad;
mapping the first location to a corresponding location within the content manipulation region; and
displaying, on the display, an indicator indicative of the mapping.

19. The electronic device of claim 18, wherein the extremity tracker includes a communication interface provided to communicate with a finger-wearable device, wherein the extremity tracking data includes finger manipulation data from the finger-wearable device via the communication interface, and wherein identifying the first location is based on at least the finger manipulation data.

20. The electronic device of claim 18, wherein the electronic device is communicatively coupled to a secondary device, and wherein the secondary device includes a secondary display that displays the content manipulation region.

21. The electronic device of claim 18, wherein the one or more programs further include instructions for:
determining, based on the extremity tracking data, that a respective extremity corresponds to a respective spatial location hovering over the computer-generated representation of the trackpad;

wherein mapping the first location within the computer-generated representation of the trackpad to the corresponding location within the content manipulation region includes:
  mapping the respective spatial location to the first location, and
  mapping the first location to the corresponding location within the content manipulation region.

22. A non-transitory computer readable storage medium storing one or more programs, the one or more programs comprising instructions, which, when executed by an electronic device with one or more processors, a display, and an extremity tracker, cause the electronic device to:
  obtain, via the extremity tracker, extremity tracking data;
  display, on the display, a computer-generated representation of a trackpad that is overlaid on a physical surface, the physical surface being viewable within the display along with a content manipulation region that is viewable within the display and is separate from the computer-generated representation of the trackpad; and
  while displaying the computer-generated representation of the trackpad:
    identify a first location within the computer-generated representation of the trackpad based on the extremity tracking data, the extremity tracking data comprising a hover distance between an extremity of a user and the computer-generated representation of the trackpad;
    map the first location to a corresponding location within the content manipulation region; and
    display, on the display, an indicator indicative of the mapping.

23. The non-transitory computer readable storage medium of claim 22, wherein the extremity tracker includes a computer-vision system that outputs extremity identification data, wherein the extremity identification data is included in the extremity tracking data, and wherein identifying the first location is based on at least the extremity identification data.

24. The non-transitory computer readable storage medium of claim 22, wherein the instructions further cause the electronic device to determine one or more dimensional characteristics associated with the physical surface, wherein the computer-generated representation of the trackpad satisfies a dimensional criterion with respect to the one or more dimensional characteristics.

25. The non-transitory computer readable storage medium of claim 22, wherein the instructions further cause the electronic device to:
  in response to determining, based on the extremity tracking data, that a corresponding extremity moves from the first location to a second location; and
  in accordance with a determination that the second location is outside of the computer-generated representation of the trackpad:
    map the second location to a second corresponding location outside of the content manipulation region; and
    display an affordance at the second corresponding location outside of the content manipulation region.

* * * * *